United States Patent [19]
Guibas et al.

[11] Patent Number: 5,748,197
[45] Date of Patent: May 5, 1998

[54] DYNAMIC COMPUTATION OF A LINE SEGMENT ARRANGEMENT USING FINITE PRECISION ARITHMETIC FOR USE IN A PROCESSOR CONTROLLED SYSTEM

[75] Inventors: Leonidas John Guibas; David H. Marimont, both of Palo Alto, Calif.

[73] Assignee: Xerox Corporation, Stamford, Conn.

[21] Appl. No.: 581,669

[22] Filed: Dec. 29, 1995

[51] Int. Cl.[6] .................................................. G06T 3/00
[52] U.S. Cl. ............................................................ 345/438
[58] Field of Search ................................ 395/143, 135, 395/123; 382/269, 266

[56] References Cited

U.S. PATENT DOCUMENTS

| 5,506,948 | 4/1996 | Onitake et al. | 395/138 |
|---|---|---|---|
| 5,574,839 | 11/1996 | Gangnet et al. | 395/142 |

OTHER PUBLICATIONS

Nahed, A. and Peroche, B., "A 2 1/2D hierarchical model based on planar maps", *Computers and Graphics*, vol. 20, No. 1, Jan./Feb., 1996, 99. 115–123.

Jon L. Bentley and T.A. Ottmann, "Algorithms for Reporting and Counting Geometric Intersections," *IEEE Transactions on Computers*, vol. C–28, No. 9, Sep. 1979, pp. 643–647.

K.L. Clarkson and P.W. Shor, "Applications of Random Sampling in Computational Geometry, II", *Discrete and Computational Geometry*, v.4, 1989, pp. 387–421.

B. Chazelle and H. Edelsbrunner, "An Optimal Algorithm for Intersecting Line Segments in the Plane",*Journal of the Association for Computing Machinery*, vol. 39, No. 1, Jan. 1992, pp. 1–54.

Ketan Mulmuley,*Computational Geometry: An Introduction Through Randomized Algorithms*, Prentice–Hall, Englewood Cliffs, N.J., 1994.

Ketan Mulmuley, in "A fast planar partition algorithm I", *Journal of Symbolic Computation*, v. 10, pp. 253–280, 1990.

Ketan Mulmuley, "Randomized Multidimensional Search Trees: Dynamic Sampling," *Proceedings of the 7th ACM Symposium on Computational Geometry* (SCG,) 1991, pp. 121–131.

Daniel H. Greene and Frances F. Yao, "Finite–Resolution Computational Geometry," *Proc. 27th Ann. Symp. on Foundations of Computer Science,* 1986, pp. 143–152.

M. Gangnet, J–C Hervé, T. Pudet and J–M Van Thong, "Incremental Computation of Planar Maps,"*Computer Graphics* (SIGGRAPH '89), vol. 23, No. 3, 1989, pp. 345–354.

H. Edelsbrunner, L. Guibas, J. Pach, R. Pollack, R. Seidel and M. Sharir, "Arrangements of Curves in the Plane–Topology, Combinatorics, and Algorithms", *Theoretical Computer Science 92* (1992), pp. 319–336.

*Primary Examiner*—Phu K. Nguyen
*Assistant Examiner*—Cliff N. Vo

[57] ABSTRACT

The present invention produces a data structure that indicates a partition of a given input set of line segments in a plane using a technique that is mathematically robust, canonical and dynamic. The technique is robust because it assumes a finite precision model of computer arithmetic and rounds the endpoints and intersections of all line segments to representable points in a way that is globally topologically consistent with the input set of line segments and that keeps the position of each rounded line segment close to the position of the input segment. The technique is canonical because the output partition produced is a function of the set of segments currently present only, and not of the history of insertion and deletions. This canonical aspect of the technique is facilitated by storing the input unrounded line segments in the partition data structure so that they are associated with their rounded fragments. The technique is dynamic because input unrounded line segments may be incrementally added to and deleted from the data structure representation of the partition without recomputing the entire partition for each change. An illustrated implementation of the technique uses a randomized incremental approach that produces a partition having the form of a vertical cell decomposition.

15 Claims, 15 Drawing Sheets

DYNAMIC COMPUTATION OF A LINE SEGMENT ARRANGEMENT USING FINITE PRECISION ARITHMETIC FOR USE IN A PROCESSOR CONTROLLED SYSTEM

CROSS REFERENCE TO OTHER APPLICATIONS

The present invention is related to two inventions that are the subject matter of concurrently filed, commonly assigned U.S. patent applications having the serial numbers and titles: Ser. No. 08/581,660, "User-Directed Interaction with an Image Structure Map Representation of an Image," and Ser. No. 60/009,418, "Rounding Line Segment Intersections to Representable Points," both of which are hereby incorporated by reference herein as if set out in full.

BACKGROUND OF THE INVENTION

The present invention relates generally to a processor-based technique in the field of computational geometry for use in computer graphics and related applications, and more particularly, to a dynamic technique for finding a partition of a plane induced by a given arrangement of line segments using finite precision computations.

Applications of computer graphics technology have extended to a wide variety of industrial design problems in many industries, including but not limited to the aerospace, computer, consumer electronics, semiconductor, and telecommunications industries. Advanced computer software design applications that are heavily grounded in computer graphics technologies are used to automate the design, analysis, and documentation of a wide variety of products and components, including, for example, electronic systems and components found in automobiles and consumer electronics. In addition, sophisticated computer graphics software is becoming an increasingly important part of the entertainment industry, used in the production of special effects and animation segments and even entire commercials and feature films.

Important and basic functions of any type of computer-implemented design application are the modeling and visualization of, and the interaction with, the object or objects being designed. These functions require robust and computationally efficient algorithms for manipulating the data structures that represent the design objects.

Many types of computer-implemented design problems that are carried out in two dimensions (2D) can be modeled as arrangements of line segments in a plane. The physical layout of telecommunications lines or cables, or a wire harness in an automobile, or an integrated circuit are just a few examples of design problems that have an arrangement of line segments in a plane as an element of their model. Computer representations of images can also be modeled as an arrangement of lines in a plane. For example, geographical features contained in maps in geographical information systems may be represented as line segments in a plane. Fundamental to the functions of interacting with and the visual display of objects modeled as arrangements of line segments is the problem of finding and correctly representing their intersections.

1. Characteristics of Planar Partition Algorithms

The field of computational geometry investigates, among other subjects, efficient and robust computational representations of, and interactions with, arrangements of line segments and other geometric objects in one or more dimensions (i.e., d-dimensional) of Euclidean space. For purposes of establishing a common framework for this background discussion, some preliminary definitions are needed in order to describe the problem solved by the present invention. The terminology used in this background section has been derived from the text, Ketan Mulmuley, *Computational Geometry: An Introduction Through Randomized Algorithms*, Prentice-Hall, Englewood Cliffs, N.J., 1994.

In a general sense that is not intended to be mathematically rigorous here, a data structure representation of a given set of line segments in a plane is referred to as a "partition" of a whole or part of the plane "induced by" the given set of line segments; the partition describes both the geometric and the topological properties of the set of line segments. The geometric properties include the positions of the line segments in the plane, typically specified by their endpoints, and the geometric definition of the edges; the topological information indicates the incidence and adjacency of the vertices, edges and faces that comprise the arrangement. A process, operation or algorithm is said to "produce" or "build" a partition; a process, operation or algorithm that produces such a data structure representation will be referred to in this background discussion as a "planar partition" algorithm.

Planar partition algorithms may be described according to, and therefore distinguished by, several operational characteristics. First, planar partition algorithms may be "static," "semidynamic" or "dynamic." A static planar partition algorithm takes as input a given set of line segments that is known a priori, and produces the partition only for the given set. A static planar partition algorithm is sometimes referred to as a "batch" algorithm. In order to add a line segment to, or delete a line segment from, a partition using a batch algorithm, the entire partition must be constructed again for each addition or deletion. In contrast, a dynamic planar partition algorithm produces a partition for a given set of line segments that allows for line segments to be added to and deleted from the partition. Thus, a partition is built for a single line segment, and is then updated for added or deleted line segments, with no requirement to know the locations of the entire set of line segments a priori. A semidynamic planar partition algorithm does not support deletion, and may only add line segments to a partition. Dynamic and semidynamic planar partition algorithms are sometimes referred to as "on-line" algorithms. They may also be referred to as "incremental" algorithms in the literature. An incremental planar partition algorithm builds the partition of a given set of line segments by adding one line segment at a time in the given set to the partition; however, an incremental algorithm is dynamic only if it operates without needing to know the locations of the entire set of line segments a priori.

Planar partition algorithms may also be characterized according to whether they are developed assuming an infinite precision or a finite precision model of computer arithmetic. With respect to algorithms in computational geometry in general, it is customary to assume, unless specifically stated otherwise, that arithmetic operations are carried out with infinite precision, in what may be referred to as the continuous domain. However, in any practical implementation of a line segment arrangement computation, the implementors must consider the effects of finite precision arithmetic on the accuracy of the resulting partition; when an algorithm is implemented in a processor using finite precision operations, in what may be referred to as the discrete domain, ensuring algorithm correctness in the face of rounding errors may prove to be a significant problem.

and algorithms must be able to handle errors explicitly to suit the needs of the application.

One potential result of rounding errors is a partition that is not topologically consistent with respect to the positions of and intersections among original line segments in the input arrangement. For example, rounding an intersection of two line segments to a representable point may introduce additional intersections in the two line segments that are not actually present in the original spatial distribution of the lines. Repeated rounding of the location of an intersection of two line segments that results from finite precision computations could produce a representation of the location of the intersection in the partition data structure that is unacceptably distant from the actual location of the intersection of the original line segments. Depending on the nature and purpose of the object being modeled, these inconsistencies may have adverse real-world consequences; for example, these inconsistencies may be unacceptable when design of the object represented by the set of line segments requires exact measurements for manufacturing or production specifications, or when the set of line segments represents the features of a map that are relied on as being reasonably faithful representations of the features of a real geographic location.

Planar partition algorithms may be further distinguished by the type of data representation used to represent the arrangement or partition of a given set of line segments. For many applications that use a partition data structure, it is important that the partition provide a mechanism for efficient spatial indexing of the locations of the line segments in the plane. The partition data structure must be able to efficiently specify the face, or cell, of each polygonal region as well as its adjacent edges and vertices; this is particularly important if the algorithm is dynamic and is intended to permit insertions and deletions of line segments. When a given set of line segments divides the plane into irregularly shaped polygonal regions, it may be more difficult to locate structures, such as faces, in the partition, simply because there are more edges and vertices to keep track of. A particular type of partition algorithm called a "trapezoidal decomposition" produces as a partition a data structure known as a "vertical cell decomposition" that partitions the plane into cells in the shape of trapezoids each of which contains a bounded number of sides; these cells are typically simpler to specify than the irregularly shaped polygonal regions, and promote efficient spatial indexing.

Planar partition algorithms are often further characterized as being "deterministic" or "randomized." This characteristic refers to how the algorithm makes processing choices during the building of the partition. A planar partition algorithm that makes the same processing choices each time it processes the same set of input line segments during the building of a partition is a deterministic algorithm. A randomized planar partition algorithm makes random or pseudo random choices with respect to some or all of the processing decisions made during the building of the partition; thus, the same set of input line segments will not produce the same sequence of processing steps each time it is processed by the randomized algorithm.

2. Examples of Planar Partition Algorithms

Examples of deterministic algorithms for constructing a planar partition induced by a set of line segments in the plane are disclosed in J. L. Bentley and T. A. Ottmann, "Algorithms for reporting and counting geometric intersections," *IEEE Transactions on Computers*, v. C-28, pp. 643–647, 1979, and B. Chazelle and H. Edelsbrunner, "An optimal algorithm for intersecting line segments in the plane," *Journal of the ACM*, v.39, pp. 1–54, 1992. The algorithm disclosed by Bentley and Ottmann is referred to in the literature variously as the "scanline," "scanning," "sweep-line" or "plane-sweep" algorithm. Given a set of line segments arranged in the plane, the basic idea is to scan the segments using an imaginary vertical line, called a sweep-line, moving in the positive x-direction. The x-coordinate plays the role of "time" during this scanning. In the terminology used above, the Bentley-Ottmann scanline algorithm is a static, or batch, algorithm. Improvements have been suggested for the scanline algorithm, including one proposed by Chazelle and Edelsbrunner in the 1992 paper cited above, which is also a static, deterministic algorithm. Neither the scanline algorithm nor the improvement proposed by Chazelle and Edelsbrunner discuss specific implementations in the finite precision domain, and it is assumed in both cases that the algorithms were developed assuming an infinite precision model of computer arithmetic.

Randomized algorithms for producing a planar partition are considered by many in the field to be simpler algorithms. K. Clarkson and P. Shor, in "Applications of random sampling in computational geometry II", *Discrete Computational Geometry*, v.4, pp. 387–421, 1989, disclose a randomized incremental algorithm for constructing a trapezoidal decomposition that assumes an infinite precision model of computer arithmetic.

Ketan Mulmuley, in "A fast planar partition algorithm I", *Journal of Symbolic Computation*, v. 10, pp. 253–280, 1990 (hereafter, "the 1990 Mulmuley I paper"), discloses a static, randomized incremental planar partition algorithm that produces a vertical cell decomposition (VCD) as the representation of a set of line segments. The VCD of a set of line segments is a refinement of their arrangement into cells that are all trapezoids (possibly degenerate) with two vertical sides. Mulmuley assumes an infinite precision model of computer arithmetic. Mulmuley, in "Randomized Multidimensional Search Trees: Dynamic Sampling," *Proceedings of the 7th ACM Symposium on Computational Geometry* (SCG,) 1991, pp. 121–131 (hereafter, "the 1991 Mulmuley Dynamic Sampling paper"), discloses a technique for producing a VCD that is a dynamic version of the randomized incremental planar partition algorithm disclosed in the 1990 Mulmuley I paper. The output of the dynamic algorithm is a hierarchy of vertical cell decompositions (VCDs) of subsets of the line segments. The lowest, most detailed level contains all the line segments. Each higher level contains a randomly chosen subset of the line segments present one level down. The hierarchy makes it possible to locate points, insert and delete line segments, and otherwise navigate around the arrangement.

Planar partition algorithms in the discrete domain have been suggested by Daniel H. Greene and Frances F. Yao, in "Finite-Resolution Computational Geometry," *Proc. 27th Ann. Symp. on Foundations of Computer Science*, 1986, pp. 143–152 (hereafter, "the Greene and Yao paper"), and by M. Gangnet, J-C Hervé, T. Pudet and J-M Van Thong, in "Incremental Computation of Planar Maps," *Computer Graphics (SIGGRAPH '89)*, Vol. 23, No. 3, 1989, pp. 345–354. Greene and Yao disclose a technique for perturbing the vertices in a line segment arrangement to lie on an integer grid. Greene and Yao treat each representable point as an "obstacle" and do not allow segments to go over an obstacle while vertices move to their nearest integral point. The movement of the vertices causes additional line segments, called fragments, to be added to the arrangement;

adhering to the obstacle rule results in creating more fragments in the perturbed segments. Greene and Yao showed that no topological inconsistencies arise between the original set of line segments and the perturbed partition as a result of this additional fragmentation. Greene and Yao also disclosed an algorithm for computing their perturbation efficiently, and describe a partition algorithm that uses a discrete version of the Bentley-Ottmann algorithm and incorporates the algorithm for computing the perturbation.

Gangnet et al. disclose the use of a planar map, which they characterize as an arrangement, to represent a partition of curves in a plane. They further disclose a deterministic algorithm for incremental insertion of new curves in the planar map, dynamically computing new intersections and updating the data structure. Gangnet et al. also discuss a finite precision implementation. The partition produced by the algorithm disclosed by Gangnet et al. is not a vertical cell decomposition.

3. Deficiencies of Existing Planar Partition Algorithms

For many robust practical applications in industrial settings, a planar partition algorithm must be dynamic and computationally efficient. At the same time, it must be robust in the sense of accurately representing the partition in the discrete domain. As noted above, planar partition algorithms that do not explicitly accommodate computations in the discrete domain introduce a degree of numerical error that may be unacceptable for a particular application. In addition, a vertical cell decomposition is a very useful representation of a partition for a large class of problems.

Algorithms that operate in a batch mode, regardless of whether they are implemented in the discrete domain, assume that all segments are given at once and are inadequate for a dynamic environment. Greene-Yao rounding has a number of undesirable properties; the requirement of not going over the obstacles adds a large number of additional breaks to each rounded segment, and these breaks make the partition more complex, especially in a dynamic environment. The algorithm disclosed in Gangnet et al. is based on a finite precision model and is dynamic but is not amenable to efficient spatial indexing. The Mulmuley algorithm is dynamic but not robust; it produces a vertical cell decomposition and provides for inserting and deleting line segments but is based on infinite precision arithmetic.

SUMMARY OF THE INVENTION

The present invention is based on the premise that many types of operations that use partitions of line segments require exact results from computations, requiring that a technique for producing a planar partition use a finite precision model of computer arithmetic.

The present invention is also based on the observation that an operation for representing vertices of a partition of line segments as representable points in a finite precision computation model must have at least two goals: the first is to keep the rounded line segments near in position to the original segments (called the geometric accuracy requirement or the "closeness requirement"), and the second is to preserve as much as possible the topology of the original partition (called the "topological consistency requirement.") The further observation is made that these two goals typically impose conflicting requirements on a planar partition algorithm that seeks to achieve them. The first goal suggests that each vertex of the original partition be rounded to its nearest representable point. However, it is well known that just doing this can cause topological inconsistencies between the original and the rounded partitions, thereby defeating achievement of the second goal. In the discussion of the present invention herein, the terms "near" or "close" when applied to line segment proximity refers to the maximum deviation permitted between an original (ideal) line segment and its corresponding rounded line segment (called a polysegment herein) in the partition.

The present invention addresses the mathematical robustness problem of planar partitions by perturbing all vertices of a partition of line segments to lie on representable points on an integer grid. One consequence of this perturbing is the breaking up of the original line segment into pieces, called fragments. In order to ensure that the perturbed partition has a topology consistent with the original partition, additional points on line segments in the partition are perturbed to the grid as well, according to a rounding operation that specifies which points these are and to which representable points they should be perturbed. In the end, all vertices, edges, and faces of the resulting perturbed partition have exact representations with finite arithmetic. The operation of perturbing vertices, edges, and faces to have representable points is called "rounding" the partition.

The rounding operation used by the present invention may be any rounding operation that is suitable for a particular application with respect to achieving the closeness requirement, provided that it achieves the topological consistency requirement. The factors that are taken into account when selecting a rounding operation are the desired accuracy of the rounded arrangement and the desired efficiency of the algorithms used to build and navigate around the partition. Generally, a rounding operation that produces more fragments than another rounding operation (e.g., when the specified degree of closeness is very small) produces rounded line segments that are very close to, and therefore more accurate representations of, the ideal line segments, but additional fragments will have an adverse effect on the efficiency of both building the partition and navigating around it.

The present invention is further based on the premise that a technique for producing a planar partition should be dynamic to permit the insertion and deletion of line segments from the partition without the need to recompute the entire partition with each insertion or deletion. Such a dynamic technique requires innovative and adaptable data structures that allow for both efficient updating and navigation around the partition.

The present invention is premised on the discovery that a data structure for representing a planar partition built using a dynamic partition algorithm based on an infinite precision model of computer arithmetic may be modified in a novel and innovative way to support a partition represented with finite precision where unrounded line segments may be inserted in and deleted from the data structure and rounded in a manner that preserves the topological consistency between the original unrounded partition and the rounded partition. The data structure provides a degree of closeness between each ideal line segment and its corresponding rounded line segment sufficient for a selected purpose or application.

Operation of the technique has the effect of doing an insertion or deletion in the original, unrounded partition and then rounding the result. The order of operations, as between insertions and deletions, has no effect on the final rounded partition produced dynamically by the technique of the present invention, and the rounded partition computed dynamically for a given set of input line segments is guaranteed to be exactly the same as what would have been produced by a batch algorithm using the same rounding operation on the same set of line segments. The planar partition technique of the present invention achieves these results in large part by storing the original unrounded line segments in the data structure along with their corresponding rounded line segments. Thus, the technique is canonical because the output partition produced is a function of the set of segments currently present only, and not of the history of insertion and deletions.

Therefore, in accordance with the present invention, there is provided a method, implemented in a machine having a processor, for dynamically producing an output partition data structure indicating a partition of a plane induced by an input unrounded line segment. The input unrounded line segment is represented by a set of real coordinates in the plane. The output partition data structure indicates an output rounded line segment representing the input line segment by a set of finite precision coordinates. The method comprises first receiving the input unrounded line segment and a signal to insert the unrounded input line segment into an input partition data structure indicating a first partition of the plane. The input partition data structure is then accessed. The input partition data structure includes data indicating a prior set of unrounded line segments; the prior set of unrounded line segments include a boundary set of unrounded line segments forming a rectangular boundary lying on the plane. Locations in the input partition data structure are capable of being specified with reference to a finite precision grid of unit squares superimposed on the plane, where each unit square has a position included therein referred to as an integral point having finite precision coordinates.

A plurality of unit squares in the finite precision grid related to the input unrounded line segment is then determined using the prior set of unrounded line segments; this plurality of unit squares related to the input unrounded line segment is referred to as a plurality of related hot pixels. Each related hot pixel includes at least one point on an unrounded line segment included in the input partition data structure. For each related hot pixel determined in the previous operation, a rounding operation is performed using the input unrounded line segment. The rounding operation replaces real coordinates of a nonintegral point on an unrounded line segment located within the boundary of the related hot pixel with the finite precision coordinates of the integral point of the related hot pixel. The rounding operation causes an unrounded line segment to be split into two fragment line segments, referred to as fragments, having a vertex at the integral point in the related hot pixel. Each fragment produced by the rounding operation is referred to as belonging to the unrounded line segment from which it was produced. The fragment line segments are then added to the input partition data structure to produce an updated output partition data structure. The input unrounded line segment is stored in the output partition data structure such that the input unrounded line segment is associated in the output partition data structure with all of the fragments belonging to the unrounded line segment from which it was produced.

The novel features that are considered characteristic of the present invention are particularly and specifically set forth in the appended claims. The invention itself, however, both as to its organization and method of operation, together with its advantages, will best be understood from the following description of the illustrated embodiments when read in connection with the accompanying drawings. In the Figures, the same numbers have been used to denote the same component acts.

DETAILED DESCRIPTION

Figure 1:
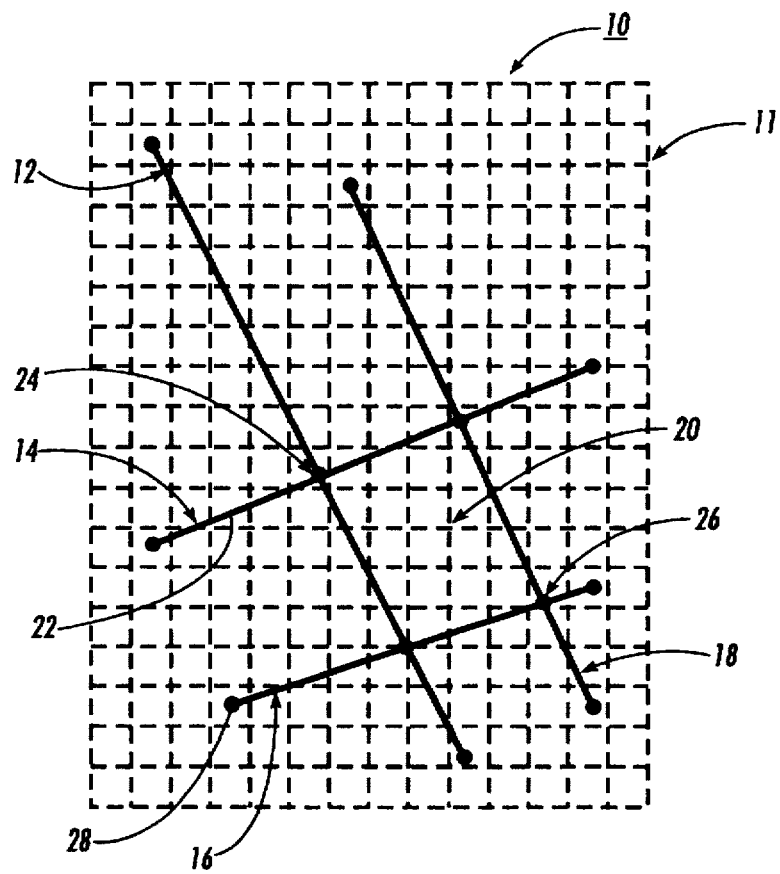
FIG. 1 illustrates a set of line segments and an associated grid of representable points in a Euclidian plane of the type that is suitable as input to the present invention for dynamically producing a rounded partition in the plane.

The detailed description below is organized as follows: Section A provides a conceptual framework for understanding the invention and the terminology used to describe the invention. Section B provides a procedural description of an illustrated embodiment of the present invention, along with a description of the partition data structure. Section C provides a description of the machine environment of the present invention and a description of the invention implemented as a software product.

A. Conceptual Framework

The present invention relates to operating a machine or system including a processor, and to processing electrical or other physical signals to produce other desired physical signals. The detailed descriptions which follow are presented largely in terms of symbolic representations of operations of data within the memory of the system. These operations require physical manipulations of physical quantities such as electrical or magnetic signals that are capable of being stored, transferred, combined, compared, and otherwise manipulated. For convenience, these physical signals will be referred to herein variously as bits, values, image locations, pixels, characters or glyphs. Further, the operations performed on the signals, referred to in terms such as adding, comparing, or determining, while commonly associated with mental operations performed by a human user, are performed exclusively by a processor of a suitable machine, and require no human capability, apart from supplying, when appropriate, the initial input document from which scanned input image signals were derived. In addition, the algorithmic descriptions of the invention that are presented herein for operating the system are not inherently related to any particular processor, machine, or other apparatus. The machine or system may be specially constructed for the required purposes or it may comprise a general purpose computer selectively activated or reconfigured by a computer program stored in the computer. Useful machines for performing the operations of the present invention include general purpose digital computers or other similar devices configured as described below and in the claims.

The following terms provide the framework for describing the embodiments of the claimed invention illustrated in the accompanying drawings. These terms have the meanings indicated below throughout this specification and in the claims, rather than any meanings that may occur in other sources, such as, for example, documents, if any, that are incorporated by reference herein elsewhere in this description.

The term "data" or "data item" refers herein to physical signals that indicate or include information. "Data" includes data existing in any physical form, and includes data that is transitory or is being stored or transmitted. For example, data could exist as an electromagnetic or other transmitted signal or as a signal stored in electronic, magnetic, or other form. Data items can be combined into a "data structure" such that the data structure "includes" the combined data items; thus, a "data structure" is any combination of interrelated data. A data structure may also include other data structures. An item of data "indicates" a thing, an event, or a characteristic when the item has a value that depends on the existence or occurrence of the thing, event, or characteristic or on a measure of the thing, event, or characteristic. A first item of data "indicates" a second item of data when the second item of data can be obtained from the first item of data, when the second item of data can be accessible using the first item of data, when the second item of data can be obtained by decoding the first item of data, or when the first item of data can be an identifier of the second item of data. For example, vertex 520 in FIG. 11 indicates a fragment, vertical attachment, or another vertex as the structure vertically above vertex 20. In another example, fragment 540 in FIG. 12 indicates its left and right vertices 542 and 544.

A "processor" is any machine, component or system that can process data, and may include one or more central processing units or other processing components. Any two components of a machine or system are "connected" when there is a combination of circuitry that can transfer data from one of the components to the other. A processor "uses" data in performing an operation when the result of the operation depends on the value of the data. An "instruction" is an item of data that a processor can use to determine its own operation. A processor executes a set of instructions when it uses the instructions to determine its operation, and an "operation" results from the processor executing the set of instructions. Thus, a set of instructions may be considered to be an operation. To "obtain" or "produce" data is to perform any combination of operations that begins without the data and that results in the data. Data can be "obtained" or "produced" by any operations that result in the data. Data can be "obtained from" or "produced from" other data by operations that obtain or produce the data using the other data.

"Memory" is any component, combination of components, circuitry, or system that can store data, and may include local and remote memory and input/output devices. A processor "accesses" data in memory by any operation that retrieves or modifies the data, such as by reading or writing a location in memory that includes the data. A processor can be "connected for accessing" data by any combination of connections with local or remote memory or input/output devices that permits the processor to access the data.

FIG. 1 illustrates a set 10 of line segments 12, 14, 16 and 18 in a Euclidean plane, a portion of which is shown as grid 11. A line segment is specified by a data item that indicates a pair of coordinate values for each of its endpoints in the plane, using a conventional coordinate system. A line segment endpoint, such as endpoint 28, and an intersection between a pair of line segments, such as intersections 24 and 26, are each called a "vertex." Each line in set 10 is divided into several intervals, such as interval 22 of line segment 14 between the left endpoint of line segment 14 and the intersection 24 of lines 12 and 14; each interval is called an "edge." Line segments 12, 14, 16 and 18 divide the plane into at least one planar area 20, which is called a "region" or a "face."

An edge is "adjacent to" a face if the edge is contained in the boundary of the face; similarly, a vertex is adjacent to an edge or to a face if the vertex is contained in the boundary of the edge or face, respectively.

A "partition data structure" representing a given set of line segments in a plane indicates a partition of a whole or part of the plane induced by the given set of line segments when the data structure includes data indicating the vertices, edges and faces of the set of line segments, the vertices adjacent to each edge, and the edges and vertices adjacent to each face. A partition data structure will also be referred to as simply a partition.

An "unrounded line segment," also referred to herein as an "ursegment," has the values of the coordinates of each of its endpoints in the plane specified as real numbers; line segments 12, 14, 16 and 18 in FIG. 1 illustrate examples of ursegments. An "unrounded vertex" has the values of the coordinates of its location in the plane specified as real numbers; vertex 24 in FIG. 1 is an example of an unrounded vertex.

A "tile" is an area of a Euclidean plane having a standardized geometric shape. "Tiling" an area of a plane divides the area of the plane into a predictable distribution of tiles where locations in each tile are accessible using the coordinate system of the plane. The distribution of tiles in a plane may be called a "grid." When the same single location in each tile is positioned on an integral coordinate in the coordinate system of the plane, the same single location is referred to as an "integral point;" an integral point may also be referred to as a "representable point."

Grid 11 in FIG. 1 represents a portion of the Euclidean plane that is tiled into unit squares; for purposes of describing this invention, each unit square will be referred to as a "pixel," but the use of this term implies no requisite association with applications or devices that operate on images, nor any limitation with respect to the utility of the present invention. The plane is assigned coordinates so that pixel centers have integral coordinates; a pixel center is therefore an integral point. Note that a unit square is a particularly useful shape for a tile in many types of applications that might utilize the present invention, but the invention may accommodate any standardized geometric shape.

A point having real coordinates on a line segment, such as an unrounded vertex, is said to be "perturbed to" or "rounded to" an integral point when the real coordinates of the point are replaced by integer coordinates; an unrounded vertex that is perturbed to an integral point may be referred to as a "rounded vertex" or a "perturbed vertex." A line segment that contains a perturbed vertex may be referred to as a "perturbed segment." Similarly, "to perturb" an unrounded vertex means to replace its real coordinates with integer coordinates.

Figure 2A:
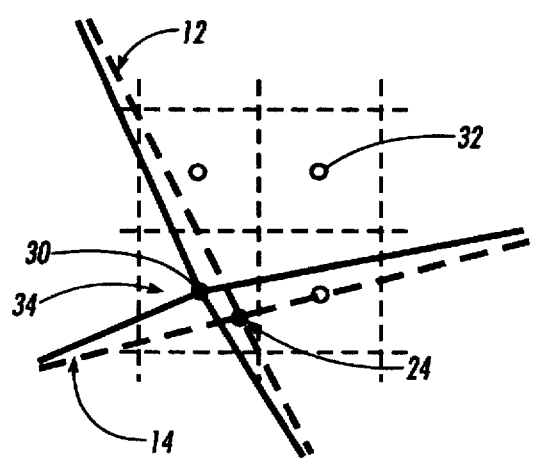
FIGS. 2A and 2B each illustrates an enlarged portion of the plane in FIG. 1, showing the intersection of two line segments and illustrating the concept of perturbing an intersection to an integral point according to the present invention.
Figure 2B:
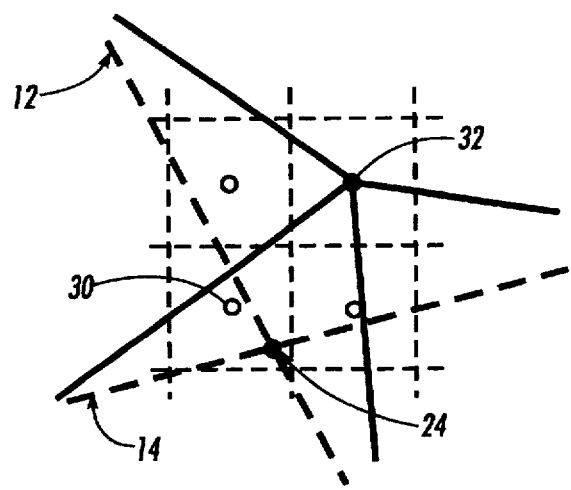

FIGS. 2A and 2B provide a visual example of perturbing an unrounded vertex to an integral point: FIGS. 2A and 2B each show a portion of grid 11 enlarged to illustrate four pixels, with an integral point in each pixel represented as a small, unfilled circle; integral points 30 and 32 are labeled in each figure. Unrounded vertex 24, which is the intersection of line segments 12 and 14 shown in FIG. 1, has been perturbed to integral point 30 in FIG. 2A, and to integral point 32 in FIG. 2B. The rounded vertex of unrounded vertex 24 now has the integer coordinates specified by integral point 30, if rounding is accomplished according to the method shown in FIG. 2A, or the integer coordinates specified by integral point 32, if rounding is accomplished according to the method shown in FIG. 2B.

A "rounding operation" is one or more operations that takes as input either an unrounded line segment or an unrounded vertex or both and produces a rounded vertex perturbed to an integral point that is determined by the operation(s). A rounding operation may also be referred to as a "set of rounding rules," or a "rounding scheme." Note that by way of example, FIGS. 2A and 2B illustrate two different rounding operations. A rounding operation when applied to a given set of input line segments during the building of a partition always produces the same rounded partition for the given set of line segments, regardless of the technique used to build the partition.

A "hot pixel" is a unit square (pixel) in a grid such as grid 11 in FIG. 1 that contains an ursegment endpoint, or the intersection point of two ursegments. In FIG. 2A, pixel 34 is a hot pixel because it contains the intersection of line segments 12 and 14; in FIG. 1, a total of twelve (12) pixels are hot pixels.

Figure 3:
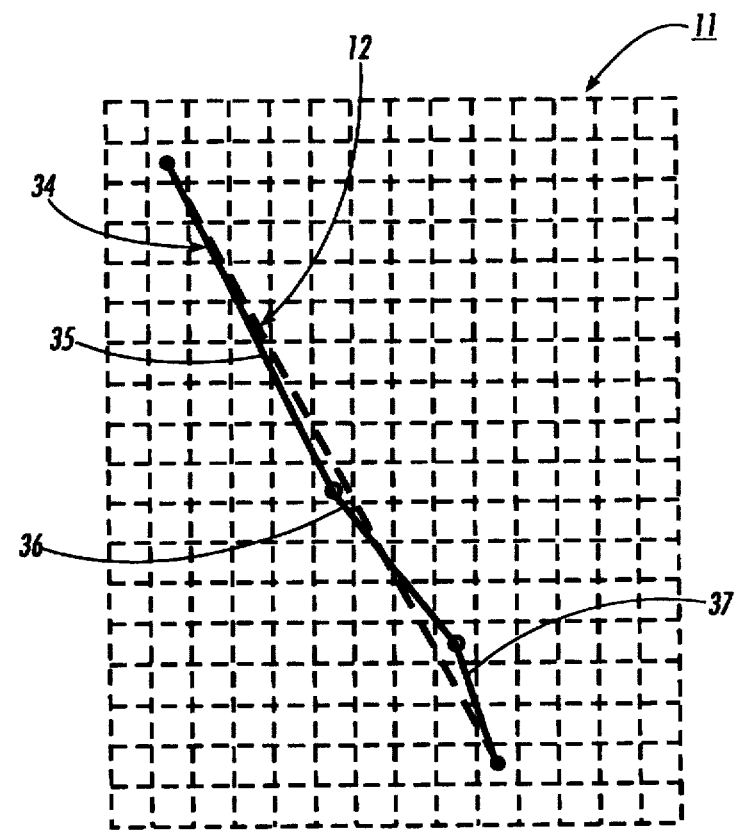
FIG. 3 shows a polysegment with fragments that results from perturbing an unrounded segment in FIG. 1 to integral points in the grid of FIG. 1.

A "polysegment" is the polygonal line that results when all of the vertices in an unrounded line segment (i.e., an ursegment) are perturbed to integral points. A polysegment includes one or more line segments, each of which is called a "fragment." FIG. 3 shows polysegment 34 that results from perturbing ursegment 12 of FIG. 1 to integral points in grid 11. Polysegment 34 contains fragments 35, 36 and 37. Note that when the endpoints of an ursegment are the only points of the ursegment perturbed to integral points, the polysegment contains only one fragment. By definition above, a point on a line segment having real coordinates that is not a vertex, referred to herein as a "nonvertex point", may also be perturbed to an integral point; perturbing a nonvertex point produces a rounded vertex in place of the point on the line segment.

A "rounded partition of line segments" for a given input set of unrounded line segments (i.e., an input set of ursegments) has all of its vertices (endpoints of segments, as well as intersections of pairs of segments) perturbed to integral points; that is, each vertex in the partition is represented by a data item that indicates a pair of integer coordinate values indicating its location in the plane. Thus, in a rounded partition, all vertices, edges, and faces of the partition have exact representations with finite arithmetic. The operation of perturbing vertices, edges, and faces to have representable points is called "rounding" the partition.

An "unrounded partition of line segments" has at least one vertex represented by a data item that indicates a pair of real coordinate values indicating its location in the plane; an "unrounded partition of line segments" will also be referred to herein as an "ideal partition of line segments."

A vertex "crosses over" a line segment when the vertex changes its original orientation in the plane with respect to the line segment to a different orientation in the plane. For example, if a vertex has an original position to the left of a line segment in a plane, the vertex crosses over the line segment when its new position is to the right of the line segment. A rounded partition of line segments is "topologically consistent" with an ideal partition of line segments when each rounded vertex retains the same orientation with respect to any particular rounded segment as the corresponding ideal vertex has with respect to the corresponding ideal ursegment.

Figure 4A:
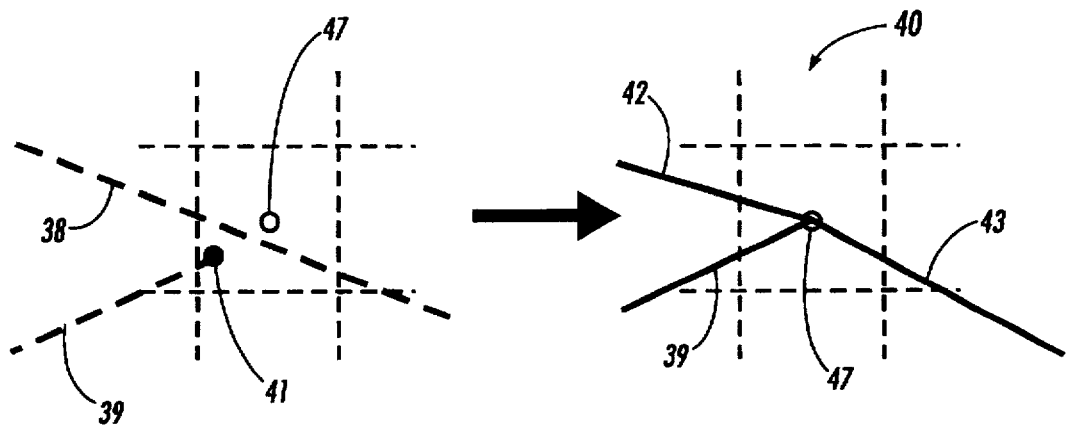
FIGS. 4A and 4B illustrate a principle of topological consistency of a line segment arrangement according to the present invention.
Figure 4B:
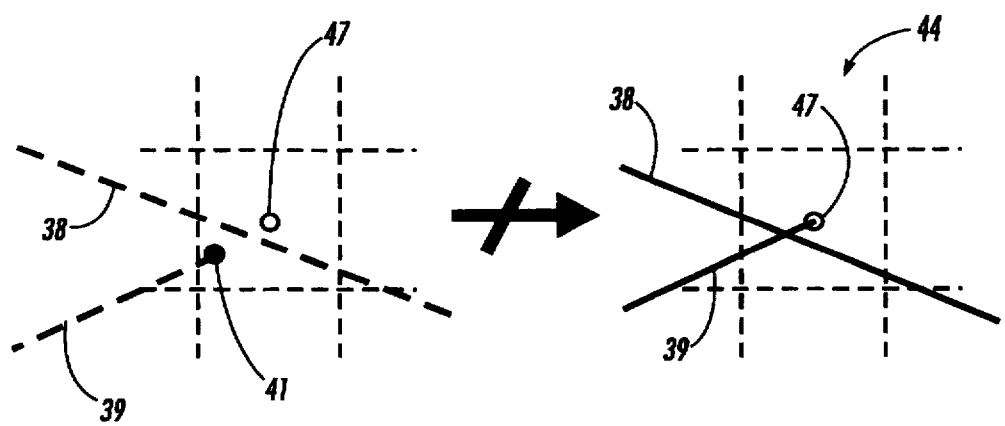

FIGS. 4A and 4B and 5A and 5B illustrate two principles of topological consistency. In all of these figures, original ursegments are shown in dashed lines before rounding, and the rounded lines (fragments) are shown as solid lines. FIGS. 4A and 4B show acceptable and unacceptable behavior for an unrounded vertex that is an endpoint. The left side of both FIGS. 4A and 4B shows unrounded line segment 39 having an endpoint 41 near but not intersecting with unrounded line segment 38 in a portion of an ideal partition. Line segment 38 passes through the pixel between endpoint 41 and integral point 47. Rounding result 40 shows endpoint 41 of line segment 39 rounded to integral point 47, and also shows line segment 38 broken into fragments 42 and 43 and now meeting line segment 39. Fragments 42 and 43 result from perturbing a nonvertex point in line segment 38 to integral point 47, thereby producing a rounded vertex in place of the point on line segment 38. The process of breaking line segment 38 broken into fragments 42 and 43 is referred to as rounding line segment 38. Rounding result 40 shows a topologically consistent rounded partition because endpoint 41 has not crossed over fragments 42 and 43 that result from rounding original line segment 38. Note that while the rounded segments of ideal segments 38 and 39 are no longer separated, the collapsing of this feature of the partition (i.e., the separation) is permitted within the definition of topological consistency. On the other hand, rounding result 44 in FIG. 4B shows endpoint 41 being rounded to integral point 47, but shows no rounding for line segment 38. This results in the rounded fragment of line segment 39 crossing over line segment 38, which is a topologically inconsistent result.

Figure 5A:
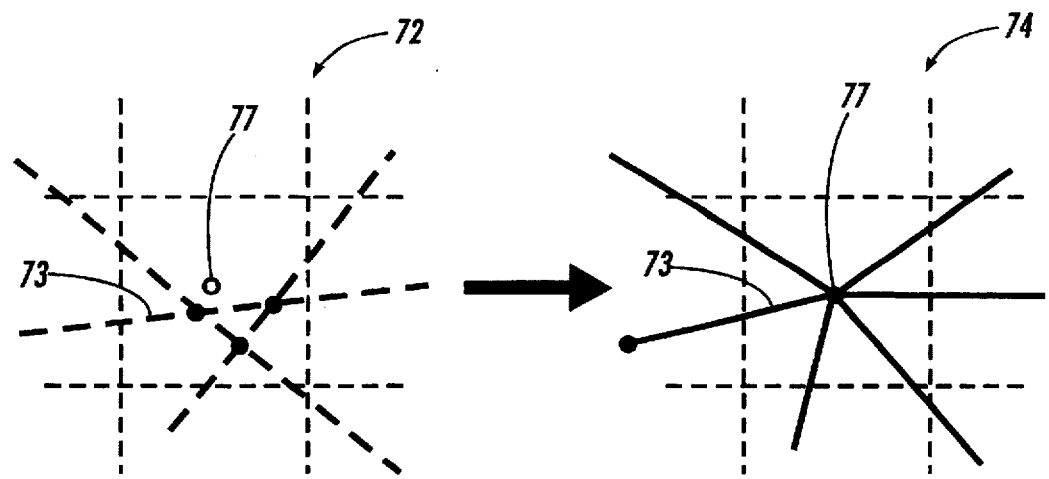
FIGS. 5A and 5B illustrate a second aspect of the principle of topological consistency of the line segment arrangement according to the present invention.
Figure 5B:
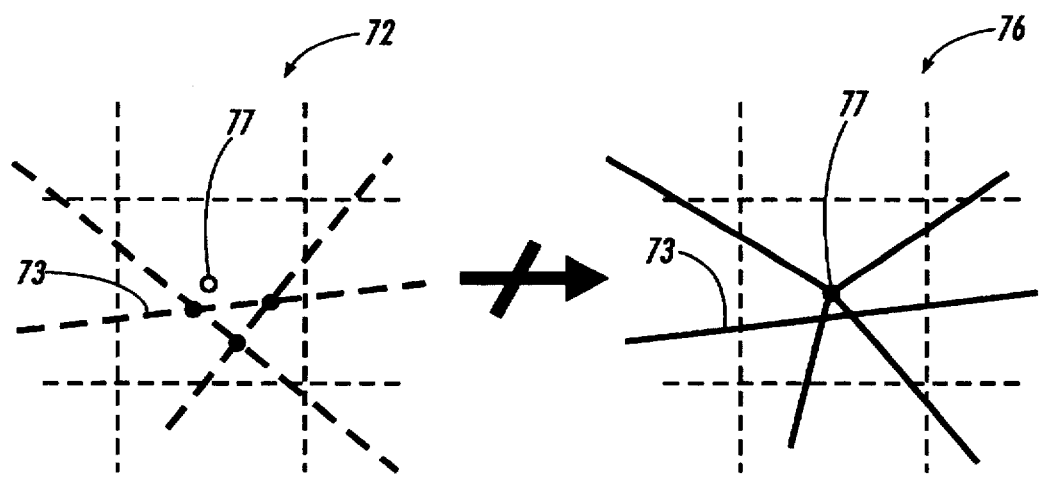

FIGS. 5A and 5B illustrate acceptable and unacceptable behavior for an ideal set 72 of three unrounded line segments (on the left sides of FIGS. 5A and 5B) that intersect each other, forming a downward pointing triangle. Rounding result 74 on the right side of FIG. 5A shows all three line segments intersecting integral point 77, with the result that the downward pointing triangle has collapsed into a single vertex. This is an acceptable rounding result that preserves topological consistency between the original set 72 of line segments and the rounded result 74. In FIG. 5B, the same set 72 of three line segments is present; rounding result 76 shows only two of the line segments rounded to integral point 77; line segment 73 is not rounded, according to the rounding scheme implemented in FIG. 5B. This results in the downward pointing triangle present in the original set 72 of line segments inverting to an upwardly pointing triangle in the rounded result 74. Rounded line segment partition 76 is topologically inconsistent with ideal set 72 of line segments because the orientation of a feature of the line segment partition 72 in relation to line segment 73 has changed.

Figure 6:
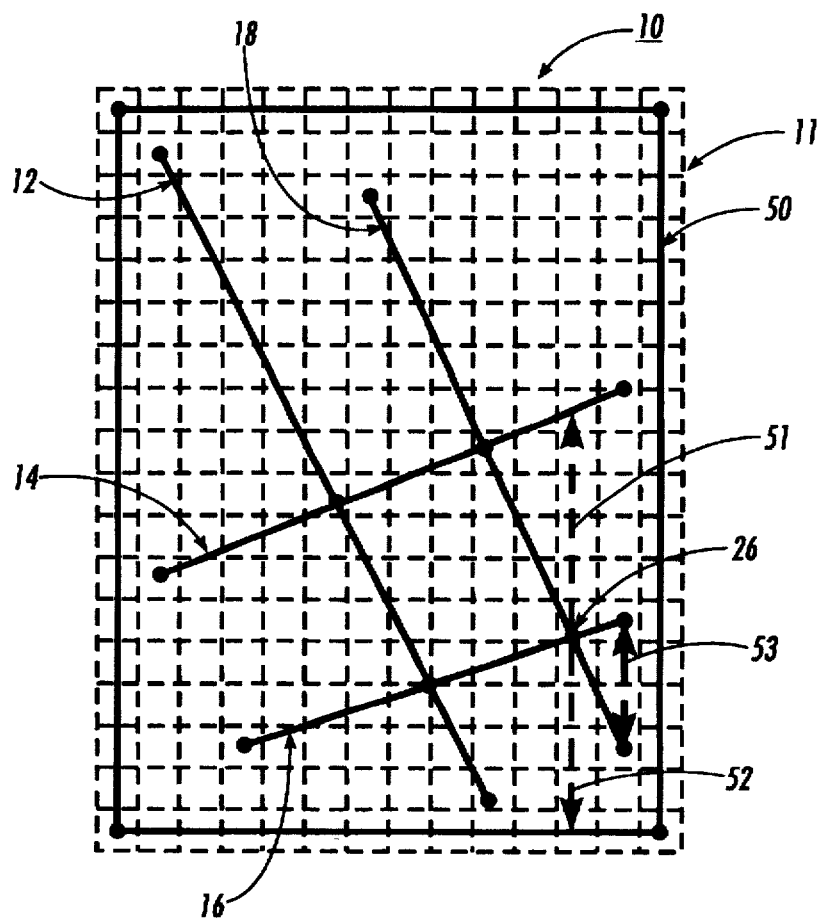
FIG. 6 illustrates a vertical attachment added to the line segment arrangement of FIG. 1.

FIG. 6 shows rectangular line segment boundary 50 around set 10 of line segments 12, 14, 16 and 18 on grid 11. Boundary 50 is comprised of four ursegments with integral endpoints, and is added to set 10 for convenience to provide a reference boundary for a coordinate system on the plane. A "vertical attachment" is a line segment that extends vertically in both +y and −y directions from a vertex (endpoint or intersection) to another line segment or another vertex, or, if the vertical attachment crosses no other line segment, then to boundary 50. FIG. 6 shows vertical attachment 51 extending from vertex 26 up to line segment 14; vertical attachment 52 extends down to the lower horizontal ursegment in boundary 50. In the figures herein, a vertical attachment will always be shown as a dashed line with a single arrow at one end, if the vertical attachment leaves a vertex and points to a fragment, such as vertical attachment 51, or with arrows at each end, if vertices are vertically aligned and a vertical attachment leaves each vertex and extends to the other vertex. Double-arrowed vertical attachment 53 is an example of what is referred to herein as a "double vertical attachment."

Figure 13:
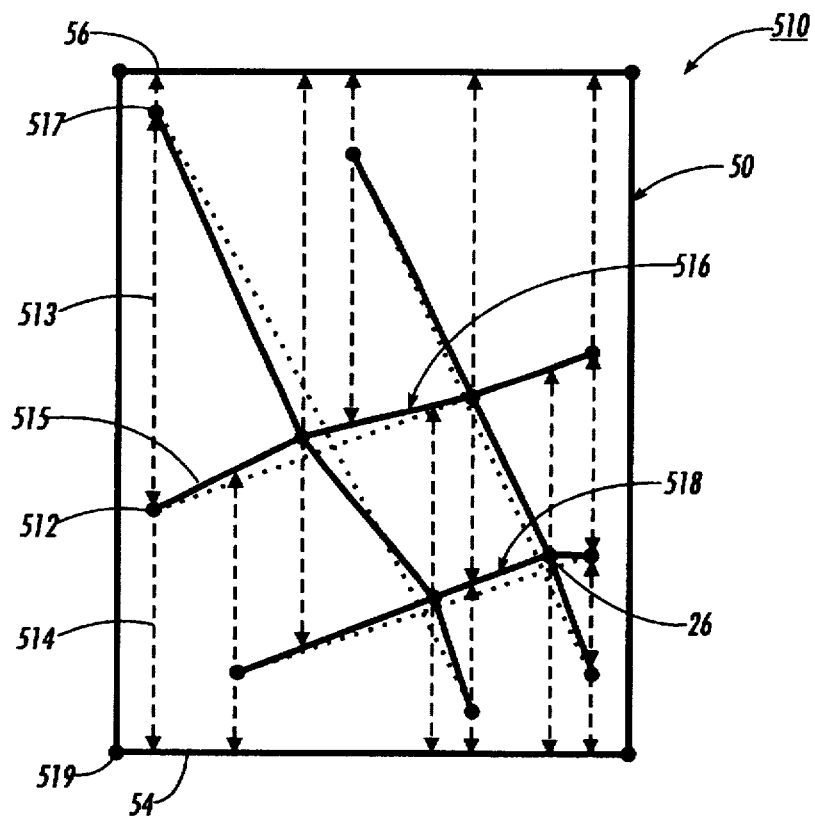
FIG. 13 shows a visual representation of the vertical cell decomposition of the set of line segments of FIG. 1, produced according to the illustrated embodiment of the present invention.

A "vertical trapezoidal decomposition" is a partition of the plane in which the regions are all trapezoids with at least one vertical side, and typically with their two parallel sides vertical. A vertical trapezoidal decomposition is also referred to as a "vertical cell decomposition" or "VCD." FIG. 13 shows a visual representation of the vertical cell decomposition of set 10 of line segments 12, 14, 16 and 18 of FIG. 1, where the partition is a rounded partition produced according to the technique of the present invention. In FIG. 13, a vertex is represented by a filled circle, a fragment with a solid line, and a vertical attachment by a dashed line with an arrow that points to the fragment at one end of the attachment. The original ursegments are represented by dotted lines. The addition of vertical attachments to a partition produces areas in the partition called "cells"; each cell is trapezoid, generally having two vertical sides, but there may also be a degenerate case of a cell, such as a triangles. A region in the partition is composed of one or more cells.

A vertical trapezoidal decomposition is an example of a larger category of partitions of the plane in which the cells are all of some standardized geometric shape, such that a data structure describing a cell requires a fixed amount of memory space. The finite precision partition data structure dynamically produced by the present invention includes partitions having cells that are all of a standardized geometric shape, such as trapezoids produced in a vertical cell decomposition, as well as partitions having irregularly shaped cells.

B. An Illustrated Embodiment of the Invention

An embodiment of the present invention has been implemented in software programs on a Silicon Graphics Indigo Elan computer running the Irix operating system, available from Silicon Graphics, Inc. (SGI) of Mountain View, Calif. The software programs implementing the invention are written in Allegro Common Lisp, a compiler for which is available from Franz Inc. of Berkeley, Calif.; the implementation uses the standard SGI Graphics Library supplied with the Irix operating system and a Common Lisp interface to the Graphics Library that Franz distributes. It will be apparent to those of skill in the art that a variety of programming languages and hardware configurations could readily be used in place of those in the illustrated embodiment based on the description herein without departing from the scope and intended utility of the present invention.

The description of the illustrated implementation that follows presumes a knowledge of the fundamental principles of planar partition algorithms in general, and of algorithms for constructing trapezoidal decompositions in particular. One of many useful texts in this regard is *Computational Geometry: An introduction Through Randomized Algorithms*, by Ketan Mulmuley (Prentice-Hall, 1994). Several chapter sections of that text discuss trapezoidal decompositions; several other sections of that text are useful as background as well; in particular, chapter 2 at pp. 29–35, 52–55, 58–66, and 78–96; chapter 3 at pp. 111–114 and 117–119; chapter 4 at pp. 126–135, 140–149, and 162–167; and chapter 5 at pp.192–210 are all hereby incorporated herein by reference as if set out in full. Also of interest for background information are the Greene and Yao paper, the 1990 Mulmuley I paper and the 1991 Mulmuley Dynamic Sampling paper, the complete citations of which are all provided above in the background discussion, and all of which are also hereby incorporated herein by reference as if set out in full. A description of the present invention may also be found in L. Guibas and D. Marimont, "Rounding Arrangements Dynamically," in Proceedings of the 11th ACM Symposium on Computational Geometry (SCG '95), Vancouver, B. C., June, 1995 (hereafter, "the Guibas and Marimont paper"), which is hereby incorporated by reference herein as if set out in full.

1. General Overview of the Dynamic, Finite Precision VCD Technique.

Figure 7:
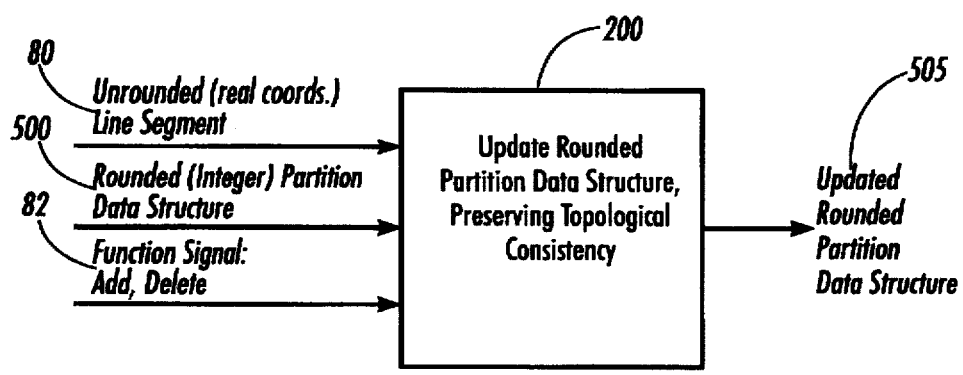
FIG. 7 is a general block diagram of the dynamic planar partition technique of the present invention showing as input, an existing rounded partition data structure, an unrounded line segment and function signal, and showing as output the updated, rounded, planar partition data structure.

FIG. 7 is a high level block diagram showing the input, output and processing of the present invention. An existing rounded partition data structure 500 is input to the present invention, along with an ursegment 80 and a function signal 82. The present invention updates, in block 200, the rounded partition data structure to have ursegment 80 added to, or deleted from, the partition, according to the processing indicated by function signal 82, producing an updated partition data structure 505. The updating process 200 is done so as to preserve topological consistency of the rounded partition with an unrounded, ideal partition of the same set of line segments. Note that a bounding set of ursegments, such as bounding rectangle 50 in FIG. 6, is always the starting point of the partition, and partitions the plane into a single region, or face.

Figure 8:
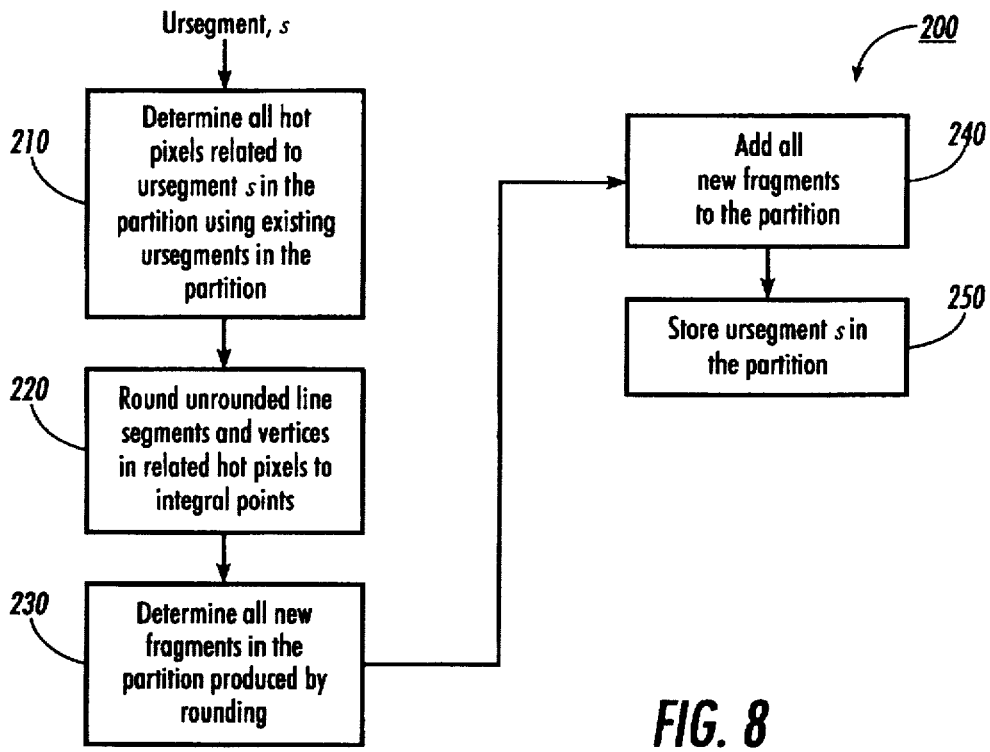
FIG. 8 is a flowchart of the expanded block 200 of FIG. 7 showing the processing operations for adding an unrounded line segment to a rounded arrangement according to the present invention.
Figure 8A:
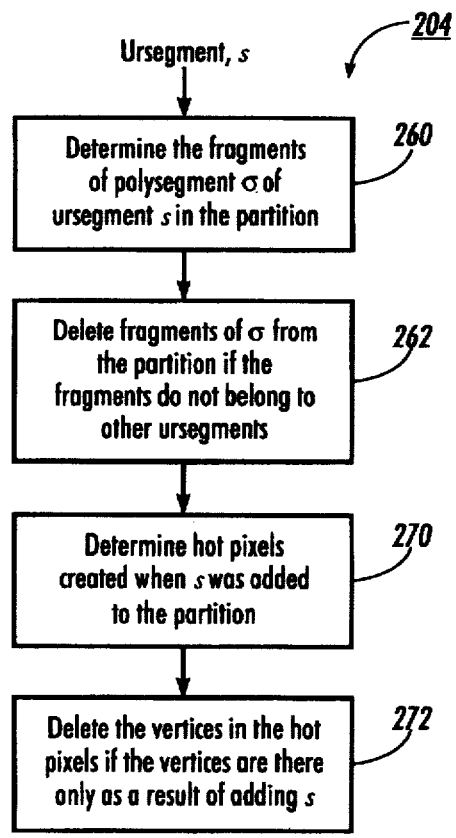
FIG. 8A is a flowchart of the expanded block 200 of FIG. 7 showing the processing operations for deleting a rounded line segment from a rounded arrangement according to the present invention.

FIGS. 8 and 8A are collectively an expanded block diagram showing block 200 of FIG. 7 expanded into its constituent primary functions 202 and 204. FIG. 8 illustrates the operations that result in adding ursegment s to a partition according to the present invention, while FIG. 8A illustrates the operations that result in deleting ursegment s from a partition. With reference to FIG. 8, adding ursegment s to a partition first includes determining, in box 210, all hot pixels that are related to ursegment s in the partition; hot pixels related to ursegment s may be referred to as "related hot pixels". There are two types of related hot pixels. The first of these are new hot pixels that include the endpoints of ursegment s, and the intersection of ursegment s with existing ursegments in the partition; in addition to including these vertices of ursegment s, the new hot pixels may also include existing ursegments that now pass through them. Thus, the operation in box 210 uses the existing ursegments stored in the partition to determine all of the related hot pixels. The second group of related hot pixels are existing hot pixels in the partition that now have ursegment s passing through them. Next, in box 220, unrounded line segments and vertices in the related hot pixels are rounded to integral points. The rounding operation produces polysegments with fragments for ursegment s and any existing ursegments passing through related hot pixels. The locations of all of these new fragments in the partition that are produced by rounding are determined in box 230. All of the new fragments are then added to the partition, in box 240, if fragments at these locations are not already present in the partition. Since ursegments may share fragments, it is possible to add an ursegment to a partition without actually adding any new fragments to the data structure, if the partition data structure is designed to support this type of addition. The added ursegment, ursegment s, is then stored in the partition in box 250. Ursegment addition operation 202 is repeated for each ursegment to be added to the partition, and it can be seen from this description of operation 202 that an ursegment can be added to the partition dynamically, without the need to reconstruct the entire partition for each ursegment addition.

Operation 202 requires that the rounding operation used in box 220 to round the unrounded line segments and vertices in the related hot pixels to integral points produce a rounded partition that is topologically consistent with the ideal partition, as defined above and illustrated in FIGS. 4A, 4B, 5A and 5B. The rounding operation that is utilized will determine a significant number of the implementation details of operation 202, including the grouping and ordering of the functions shown in FIG. 8.

With reference now to FIG. 8A, deletion operation 204 takes as input an ursegment s that is to be deleted from an existing rounded partition, and the current partition data structure (not shown.) Since ursegment s is represented in the rounded partition as a polysegment, which shall be referred to as polysegment a, the first process in the deletion operation is to determine the fragments of polysegment ( of the ursegment that is to be deleted, in box 260. Those fragments that are not included in any other ursegment are then deleted from the partition, in box 262. In addition, certain fragments and vertices of existing ursegments were created when those ursegments passed through the hot pixels of ursegment s when s was originally added to the partition; thus, the hot pixels created when s was added to the partition need to be determined, in box 270; the vertices in these new hot pixels are deleted from the partition, in box 272, if their inclusion in the partition is due solely to the presence of the ursegment being deleted.

2. The rounding operation of an illustrated embodiment of the invention.

As noted above, any suitable rounding operation may be employed in carrying out the present invention that guarantees that a partition of at least two rounded line segments is topologically consistent with the partition of their original ursegments. In the illustrated embodiment described below, the rounding operation includes a set of rounding rules that are mathematically provable as producing a rounded partition that is topologically consistent with the partition of their original ursegments.

The first rounding rule states that when a vertex occurs within the boundary of a hot pixel, the vertex is perturbed to the integral point of the hot pixel. The second rounding rule states that when an ursegment passes through a hot pixel, it is perturbed to pass through that pixel's integral point. The rules provide that a fragment is added to an ursegment only where a vertex of the partition lies on the segment, or where the ursegment passes "near" an integral point which either is or will become a vertex of the rounded partition, where "near" is defined as being within the boundary of the hot pixel. Note that the Guibas and Marimont paper refers to the two rules of rounding collectively as a process called "snap rounding."

Figure 9:
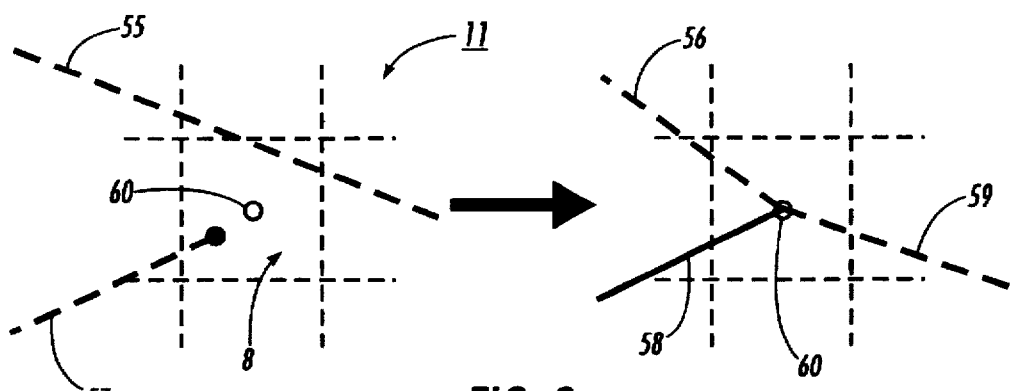
FIG. 9 illustrates the first of two rules for rounding vertices to integral points according to an illustrated embodiment of the present invention.
Figure 10:
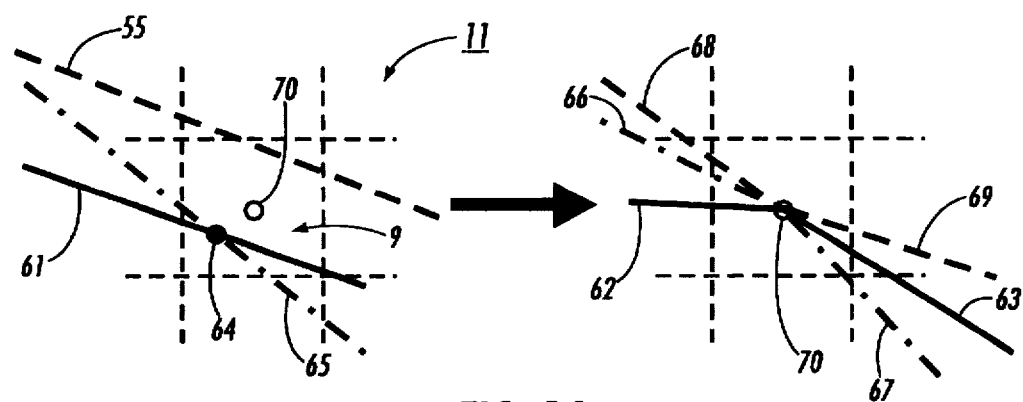
FIG. 10 illustrates the second of two rules for rounding vertices to integral points according to an illustrated embodiment of the present invention.

FIGS. 9 and 10 illustrate the two rounding rules. With reference to FIG. 9, the left side of FIG. 9 shows two ursegments 55 and 57 in a portion of grid 11 that includes pixel 8; ursegment 57 terminates in pixel 8, such that pixel 8 includes a vertex (the endpoint), thus making pixel 8 a hot pixel; ursegment 55 passes through the hot pixel. The right side of FIG. 9 shows the result of applying the two rules. It can be seen that the first rule results in ursegment 57 being perturbed to integral point 60; ursegment 57 thus becomes perturbed segment 58. The second rule results in ursegment 55 being divided into two fragments 56 and 59 of what is now a polysegment; this is required in order to perturb ursegment 55 to integral point 60. Note that ursegment 57 may also be divided into two (or more) fragments, depending on whether the remaining portion of ursegment 57 not shown in FIG. 9 passes through one or more additional hot pixels; if only the endpoints of ursegment 57 are perturbed, the perturbation produces a polysegment having only one fragment.

FIG. 10 illustrates the rounding rules applied to a hot pixel that contains an intersection of two ursegments and an ursegment that passes through a pixel containing an intersection. The left side of FIG. 10 shows three ursegments 55, 61 and 65 in a portion of grid 11 that includes pixel 9; the ursegments are distinguishable by the patterning used to draw them. Pixel 9 contains integral point 70. Ursegments 61 and 65 intersect in pixel 9 at vertex 64, thus making pixel 9 a hot pixel; ursegment 55 passes through pixel 9. The right side of FIG. 10 shows the result of applying the rounding rules to ursegments 55, 61 and 65. As in FIG. 9, ursegment 55 is divided into two fragments, labeled 68 and 69, of what is now a polysegment. Vertex 64 formed by the intersection of ursegments 61 and 65 is shown perturbed to integral point 70 on the right side of FIG. 10. This results in each ursegment being divided into fragments of a polysegment; ursegment 61 is divided into fragments 62 and 63, and ursegment 65 is divided into fragments 66 and 67.

When rounding is accomplished according to the set of rounding rules of this illustrated embodiment of the invention, several other topological properties of the rounded partition are also guaranteed: no fragments intersect except at their endpoints; if ursegment r intersects ursegment s and then ursegment t, then polysegment p cannot intersect polysegment τ before polysegment σ; and if a vertical line l through pixel centers intersects ursegment s and then ursegment t, then l cannot intersect polysegment τ before polysegment σ.

The rounding scheme of the illustrated embodiment produces polysegments that are always within one pixel of their corresponding ursegment. Since the perturbation of an unrounded line segment happens by routing the ursegment to pass through the centers of the hot pixels it crosses, no point of the ursegment is perturbed by more than a pixel, and it follows that the whole ursegment is never more than the distance of a pixel away from its associated polysegment. Put another way, a fragment is always within a distance of 1/√2 (square root of 2) times the length of the side of a pixel from its ursegment. Thus, the requirement of geometric accuracy, or "closeness" is met for a large range of applications using the rounding scheme of the illustrated embodiment.

3. Data structures of an illustrated embodiment of the invention.

Figure 11:
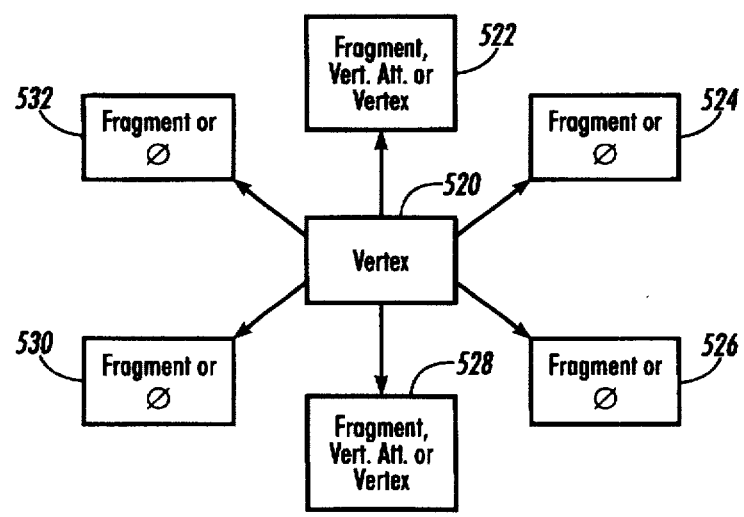
FIG. 11 schematically illustrates a vertex data structure that is part of the vertical cell decomposition data structure visually illustrated in FIG. 13 and produced according to the illustrated embodiment of the present invention.
Figure 12:
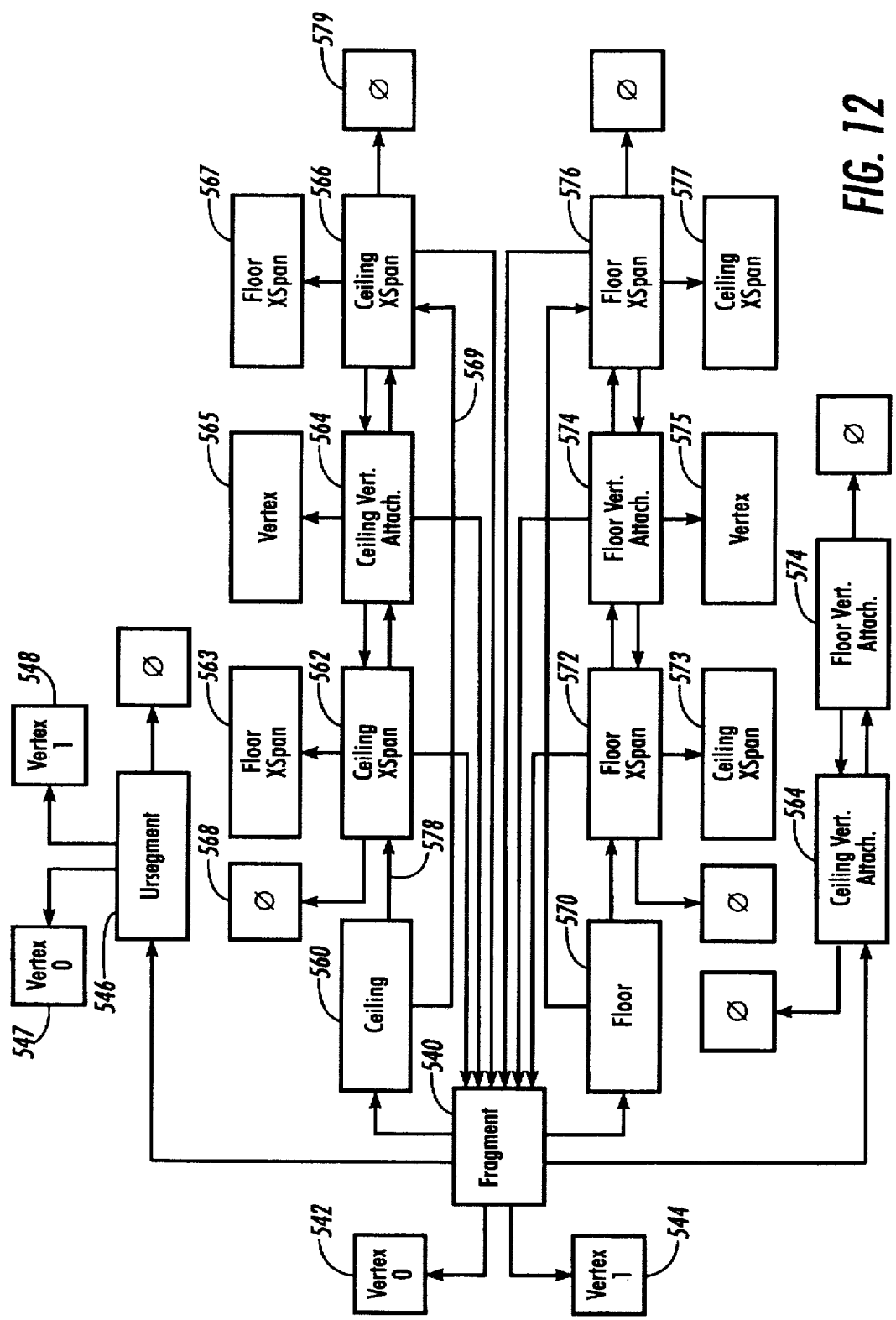
FIG. 12 schematically illustrates a representative fragment data structure that is part of the vertical cell decomposition data structure visually illustrated in FIG. 13 and produced according to the illustrated embodiment of the present invention.

FIG. 13 shows a visual representation of the vertical cell decomposition (VCD) 510 of set 10 of line segments 12, 14, 16 and 18 of FIG. 1. As noted earlier, the VCD is bounded, for convenience, with a rectangle 50 of four ursegments with integral endpoints. Each ursegment has one fragment; the bounding fragments are shown in solid lines, and horizontal bounding fragments 54 and 56 are specifically called out. In FIG. 13, the given set 10 of input ursegments are shown in dotted lines, the rounded polysegments are shown in solid lines, and vertical attachments are shown in dashed lines with arrows. FIGS. 11 and 12 schematically illustrate two of the data structures that define a VCD produced according to the illustrated embodiment of the present invention. Data items in the data structure are represented by labeled boxes in the figures. FIG. 11 shows the vertex data structure; each vertex in FIG. 13 is represented by a vertex data structure of the type shown in FIG. 11. FIG. 12 shows a representative fragment data structure for a nonvertical fragment; each nonvertical fragment in FIG. 13 is represented by a fragment data structure of the type shown in FIG. 12. There is a third data structure, not shown in the figures, for representing information about a vertical attachment, and a separate data structure, also not shown for representing information about vertical fragments. The vertex, vertical and nonvertical fragment and vertical attachment data structures collectively represent the VCD that is built by the illustrated embodiment of the present invention. Note that the entire VCD data structure is accessed by a pointer to the left vertex 519 (FIG. 13) of bottom horizontal bounding ursegment 54.

a. The Vertex Data Structure.

With reference to FIG. 11, the vertex data structure includes vertex location 520. Vertex 520 includes pointers to all other structures in the VCD that are adjacent to vertex 520, as shown by the arrows that point to boxes 522, 524, 526, 528, 530 and 532. The vertex pointers in the illustrated embodiment are defined according to the geometry of the partition, such that box 522 points to a fragment, vertical attachment or another vertex that is positioned vertically above vertex 520 in the partition, while box 528 points to a fragment, vertical attachment or another vertex that is positioned vertically below vertex 520 in the partition. Note that a vertex points to a vertical attachment when that vertical attachment is directed into the vertex, represented by the arrowheads at the end of the vertical attachments shown in FIG. 13. When vertices are vertically aligned, each has a vertical attachment directed to the other, and the two vertical attachments are represented as a single structure which may be referred to as a double vertical attachment. Each vertex of the pair of vertically aligned vertices points to the other vertex in box 522 or box 528.

Box 524 of FIG. 11 contains the fragment in the partition that is adjacent to and positioned upward and to the right of vertex 520 in the partition (called the top right fragment), while box 532 contains the fragment in the partition that is adjacent to and positioned upward and to the left of vertex 520 in the partition (called the top left fragment). Similarly, boxes 526 and 530 contain the fragments in the partition that are adjacent to and positioned downward and to the right or left, respectively, of vertex 520 in the partition (called the bottom right and left fragments). There may be other fragments adjacent to vertex 520 in between the top and bottom fragments pointed to by vertex 520. These other fragments are located using a portion of the fragment data structure called the floor and ceiling lists, described in more detail below, since the ceiling list of the bottom fragment points to structures on the floor list of a fragment located above the bottom fragment, and thus these intermediate fragments can be located. Note that if there is only one fragment located to the right or to the left of a vertex, both top and bottom fragments point to the same fragment. Analogously, if no fragment is present at the right or left of a vertex, both top and bottom pointers are empty.

With reference to FIG. 13, the vertex data structure for vertex 512 contains the location of vertex 512 in box 520; box 528 indicates a pointer to vertical attachment 514, and boxes 524 and 526 indicate a pointer to fragment 515. Vertical attachment 513 in FIG. 13 illustrates a double vertical attachment, and so box 522 indicates a pointer to vertex 517. The other pointers 530 and 532 are empty. It can be seen that vertex 26 in FIG. 13 would have pointers to four fragments in addition to the pointers to the vertical attachments.

b. The fragment data structure.

With reference to FIG. 12, the fragment data structure indicates information about each nonvertical fragment 540 in the partition. Fragment 540 points to the endpoints of the fragment, shown as left vertex 542 (labeled Vertex 0) and right vertex 542 (labeled Vertex 1). Nonvertical fragments typically have a sequence of structures above and below them, which are represented with two doubly linked lists called the "ceiling" (for the structures above) and "floor" (for those below) lists of the fragment. In addition to facilitating vertical motion from a nonvertical fragment, the ceiling and floor lists make it easy to move along the fragment.

Figure 14:
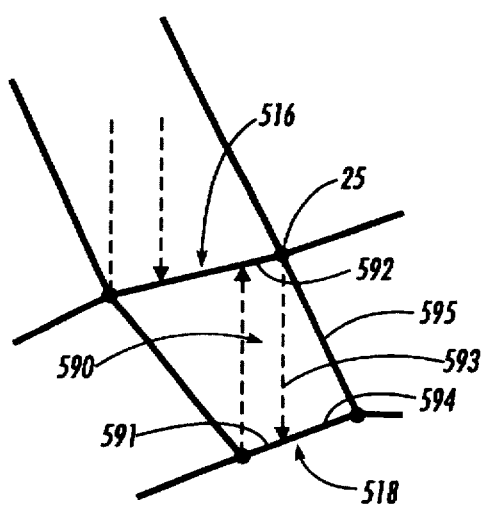
FIG. 14 is a portion of the vertical cell decomposition illustrated in FIG. 13, illustrating structures in the vertical cell decomposition that are included in the fragment data structure of FIG. 12.

FIG. 12 illustrates ceiling 560 and floor 570 lists of a representative nonvertical fragment 540. Nonvertical fragments 516 and 518 in FIG. 13 are examples of nonvertical fragment 540, and a portion of the VCD illustrated in FIG. 13 that includes nonvertical fragments 516 and 518 is reproduced in FIG. 14. A vertical attachment that is directed to a fragment defines a partition of the interval in x occupied by the fragment. This partition of the fragment in x is represented by a structure called an "xspan". When an xspan occurs as a structure above the fragment, it is called a "ceiling xspan;" similarly, when an xspan occurs as a structure below the fragment, it is called a "floor xspan." Each trapezoid in the VCD is bounded below by a ceiling xspan (belonging to the fragment at the bottom of the trapezoid) and above by a floor xspan (belonging to the fragment at the top). For example, trapezoid 590 in FIG. 14 is bounded below by the first xspan 591 on the ceiling list of fragment 518, and above by the second xspan 592 on floor list of fragment 516. The floor and ceiling xspans that bound a trapezoid point to each other, which makes it possible to move vertically across a trapezoid.

Each of the ceiling and floor lists in the fragment data structure of FIG. 12 includes an xspan, followed by zero or more sequences of a vertical attachment followed by an xspan that partition the remainder of the fragment. Each of the ceiling list 560 and floor list 570 in the fragment data structure of FIG. 12 are illustrated to include an xspan 562 or 572, followed by one sequence of a vertical attachment 564 or 574 followed by an xspan 566 and 576. The doubly-linked structure of the ceiling and floor lists is illustrated in the ceiling list by arrows 578 and 569, pointing to the head and tail of the lists, respectively, and by empty list items 568 and 579 at the end of each list path. Ceiling xspan 562 bounds the bottom of a trapezoid in the VCD and points to the floor xspan 563 that bounds the top of that trapezoid. Ceiling vertical attachment 564 points to the vertex data structure 565 from which ceiling vertical attachment 564 extends. Floor list 570 is organized in an analogous manner.

FIG. 14 in conjunction with FIG. 12 shows fragment 518 in more detail, and illustrates with a specific example the data contained in the ceiling list 560 (FIG. 12) of a fragment. The structures on the top, or ceiling, of fragment 518 in FIG. 14 include ceiling xspan 591, followed by ceiling vertical attachment 593, followed by ceiling xspan 594. In the fragment data structure 540 of FIG. 12 for fragment 518, ceiling list 560 will include these structures as ceiling xspan 562, ceiling vertical attachment 564, and ceiling xspan 566, respectively. In addition, in FIG. 14 it can be seen that ceiling xspan 591 points to floor xspan 592; ceiling vertical attachment 593 extends from vertex 25; and second ceiling xspan 594 points to floor xspan 595. Ceiling list 560 in the fragment data structure 540 of FIG. 12 for fragment 518 will also include these structures as floor xspan 563, vertex 565 and floor xspan 567, respectively. Similarly, the floor list 570 of the fragment data structure 540 for fragment 516 (the fragment directly above fragment 518 in FIG. 14) is constructed in an analogous manner using the structures shown on bottom, or floor, of fragment 516.

Two other linked lists are maintained with each fragment in the fragment data structure: a vertical attachment list and an ursegment list. To cross from the floor of a nonvertical fragment to its ceiling (or vice versa), fragment 540 points to a doubly linked list consisting of all vertical attachments on the floor and ceiling lists; in FIG. 12, a representative vertical attachment list shows ceiling vertical attachment 564 and floor vertical attachment 574 on this list.

Because rounding can cause two or more ursegments to share the same fragment, each fragment may be part of more than one ursegment; each fragment maintains a list of ursegments that it represents. Extensive experimentation has shown that these lists rarely have more than five ursegments. In the case of fragment 518 in FIGS. 13 and 14, ursegment 546 would indicate ursegment 16 (shown in FIG. 1). An ursegment points to the vertices at its endpoints, shown as vertices 547 and 548 in FIG. 12.

c. Other Data Structures.

The two data structures not shown, the vertical attachment data structure and the vertical fragment data structure, are organized as follows. A vertical attachment data structure, such as ceiling vertical attachment 564, indicates its originating vertex, whether it is a ceiling or a floor vertical attachment, and the fragment with which it is associated. A vertical fragment data structure, indicates its vertices and a list of the ursegments that it represents. There is also a region data structure (not shown) which identifies the cells that belong to a region of the partition.

d. The data structure hierarchy.

The illustrated embodiment of the present invention produces a hierarchy of VCDs, where the lowest level (level zero) contains all the ursegments, and each successively higher level contains a subset of the ursegments present one level down. Adjacent levels are linked through their hot pixels and ursegments; each hot pixel or ursegment at level i has a "descent" pointer down to the corresponding hot pixel or ursegment at level i-1. Hot pixels and ursegments are the structures chosen to link VCDs at adjacent levels because, unlike either fragments or vertical attachments, hot pixels and ursegments form a strict hierarchy: once a hot pixel or ursegment appears at a level, it must appear at all lower levels. Note that the entire VCD data structure hierarchy is accessed by a single pointer to the left vertex of the bottom horizontal ursegment in the top (zero) level of the hierarchy.

4. Point Location.

Figure 15:
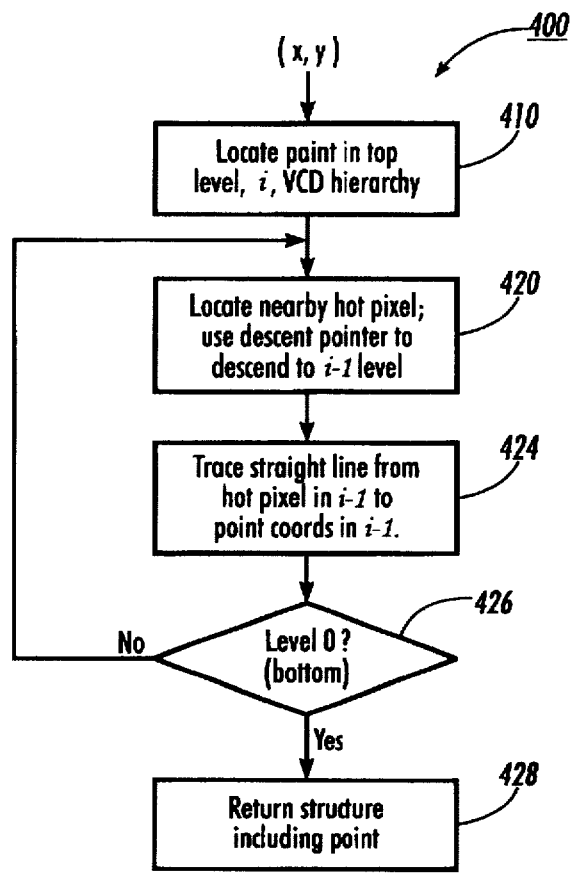
FIG. 15 is a flowchart showing the process for locating a point in the hierarchical vertical cell decomposition data structure according to an illustrated embodiment of the present invention.
Figure 16:
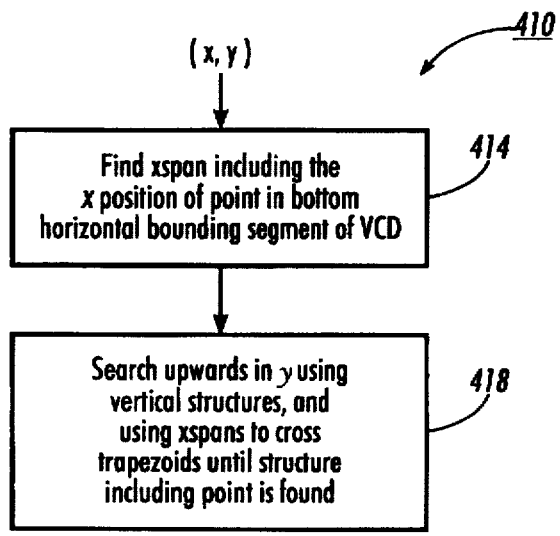
FIG. 16 is a flowchart illustrating point location in a single level vertical cell decomposition data structure according to an illustrated embodiment of the present invention.

The data structures of the VCD make it easy to move both vertically and horizontally. Moving vertically from a vertex, vertical fragment, or vertical attachment is straightforward because each can have only one structure above and one below. Movement both vertically and horizontally is facilitated by the xspan structures. FIG. 15 is a flowchart showing point operation 310 for locating a point in the VCD data structure hierarchy; FIG. 16 illustrates point location in a single level. The point location operation illustrates how the data structures representing the VCD are used.

A point in the partition may be located at a vertex, at a position on a fragment, at a position on a single or double vertical attachment, or in the interior of a trapezoid. Point location operation 400 takes as input a set of x, y coordinates defining a point in the plane of the partition, and returns a vertex if the point is at a vertex, a floor and ceiling list entry that includes the point if the point is on a fragment, a vertical attachment if the point is on a vertical attachment, and, if the point is in the interior of a trapezoid, the ceiling (bottom) xspan of the trapezoid.

With reference to FIG. 15, to locate a point at the bottom (most detailed) level of the hierarchy of VCDs, first locate it in the top (least detailed) VCD in the hierarchy, say at level i, in box 410. FIG. 16 shows a technique for locating a point in a level of the hierarchy in the illustrated embodiment. First, in box 414, the xspan containing the x coordinate of the point is found by linearly searching the ceiling list of the horizontal fragment that defines the bottom of the VCD's bounding rectangle. Then, in box 418, an upward search in y is carried out, using the vertical structures in the partition (i.e., the vertices, vertical attachments and vertical fragments) and using xspans to cross trapezoids, until the structure that contains the point is found.

Returning to FIG. 15, once the structure containing the point is found, a nearby vertex, which by definition is in a hot pixel, is found next, in box 420, using the structure and its pointers; this nearby hot pixel is never more than a pointer or two away, because every cell has at least two hot pixels on its boundary. The descent pointer of the nearby hot pixel is then used to locate the corresponding hot pixel in the VCD one level down, at level i-1. To locate the point from a vertex (in a hot pixel) at level i-1, a straight line is traced through the VCD from the hot pixel to the point, in box 424. The current level is tested, in box 426, to see if the bottom level of the hierarchy of VCDs has been reached; if so, the structure that includes the point can be found using the pointers in the vertex data structure and the coordinates of the traced line, and this structure is then returned, in box 428. If the bottom level has not yet been reached, steps 420 and 424 are repeated until the bottom level of the hierarchy has been reached.

5. Inserting Ursegments in the Illustrated Embodiment of the Present Invention.

Figure 17:
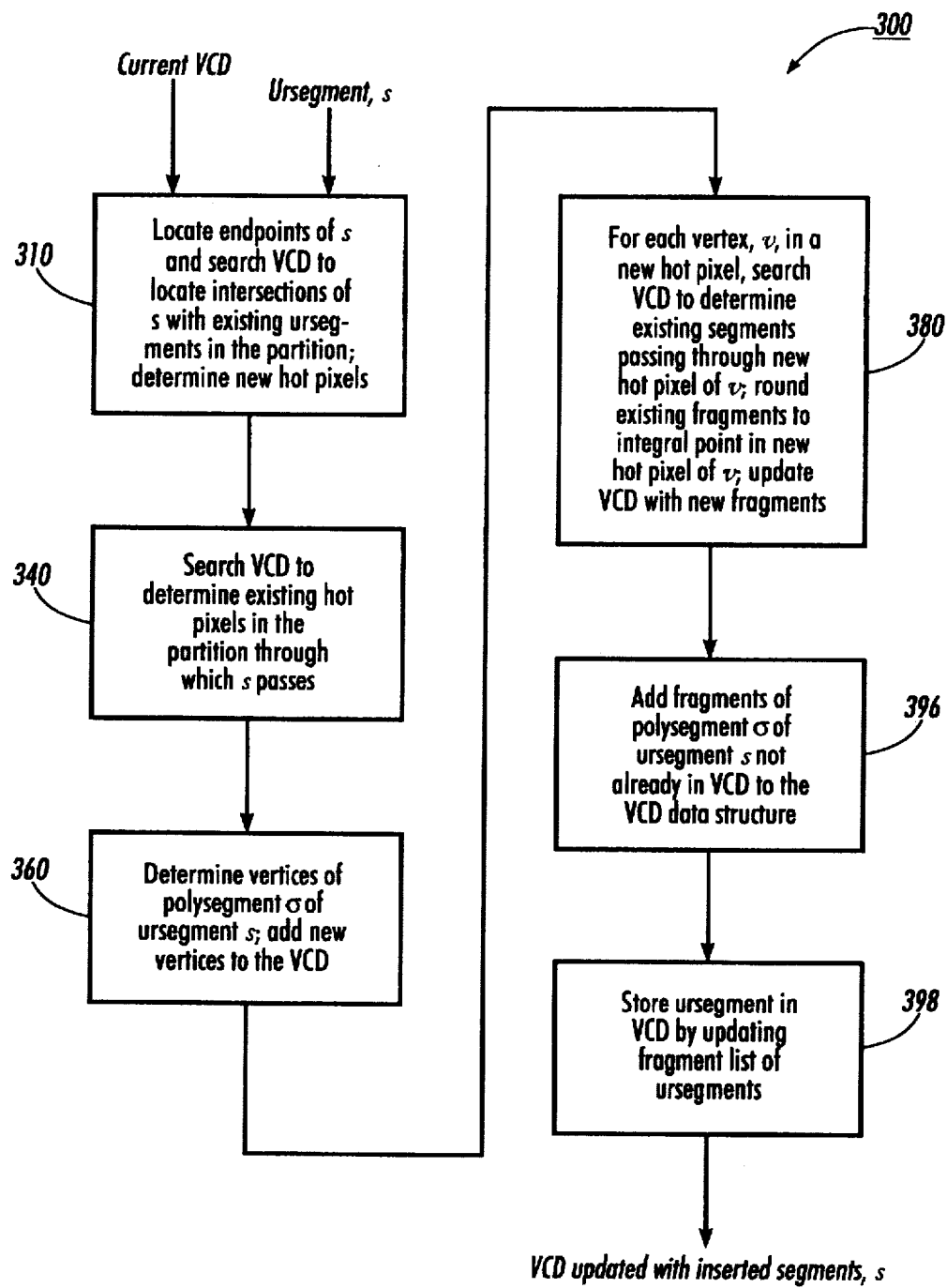
FIG. 17 is a flowchart illustrating the operation of inserting an unrounded line segment into the arrangement according to an illustrated embodiment of the present invention.

FIG. 17 illustrates operation 300 for inserting an unrounded line segment s into the VCD data structure according to the illustrated embodiment of the present invention. Insertion operation 300 involves two general concepts: first, the polysegment, σ, of s and all of its fragments must be determined so that fragment data structures of the type illustrated in FIG. 12 can be inserted into the VCD data structure. Secondly, the insertion of s creates new hot pixels through which pass existing ursegments in the partition; to complete the insertion of s according to the rounding operation rules of the illustrated embodiment, these existing ursegments must be rounded to the integral points of the respective new hot pixels through which they pass.

The illustrated embodiment of the present invention uses three different searches in the VCD data structure to accomplish insertion. Two of these searches, in boxes 310 and 340 of FIG. 17, locate the new and existing hot pixels that new ursegment s passes through. Ursegment s is rounded to the integral points of these new and existing hot pixels, creating vertices on s. The polysegment a of s is defined by the vertices of the new and existing hot pixels found in these two searches. Once the vertices of a are known, they are added to the VCD, in box 360.

As noted earlier in the discussion of FIG. 8, existing ursegments may pass through the new hot pixels created by inserting ursegment s into the VCD data structure. For each vertex, v, of a new hot pixel, the search in box 380 locates the existing ursegments that pass through v's new hot pixel and perturbs the fragments of these ursegments to the integral point of the new hot pixel of v. The new fragments that result from this rounding are identified and new fragment data structures for the new fragments are added to the VCD. For a fragment that is already in the VCD data structure, only the ursegment it represents is required to be add to the existing fragment's list of ursegments.

Then, in box 396, those fragments of the polysegment σ of s not already in the VCD are added to the VCD, in box 396. These new fragment data structures have the new ursegment s as the only member of the fragment's list of ursegments. By the topological consistency properties of the rounding operation of the illustrated embodiment, these fragments intersect no others, which makes the insertion straightforward. For a fragment of σ that is already in the VCD data structure, only the new ursegment is required to be add to the existing fragment's list of ursegments. Storing ursegments in the VCD, in box 398, simply requires adding the ursegment to the appropriate fragment's list of ursegments.

Figure 18:
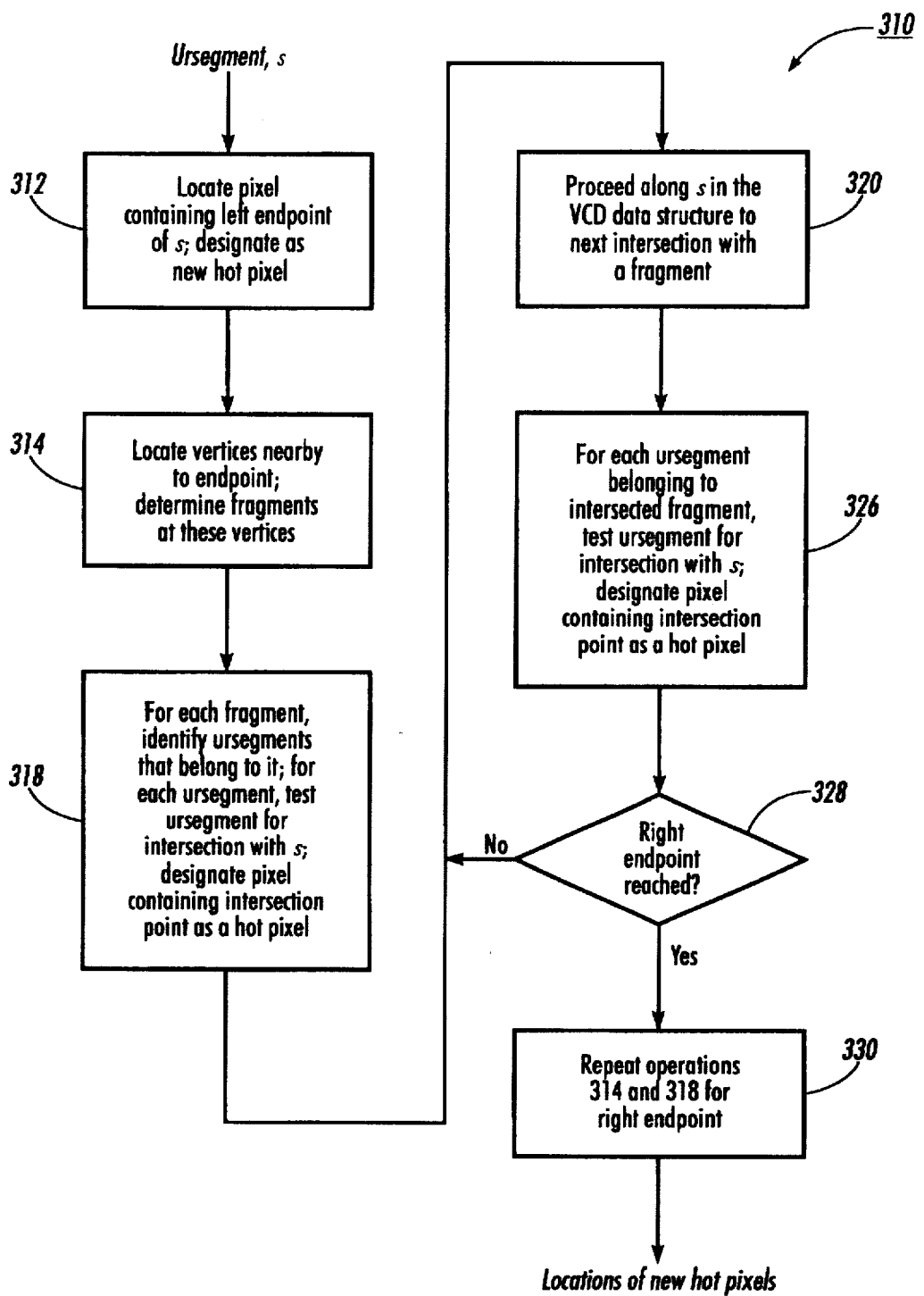
FIG. 18 is a flowchart illustrating one of the searches of the VCD data structure illustrated in FIG. 17 to locate new hot pixels created by the new ursegment, according to an illustrated embodiment of the present invention.
Figure 19:
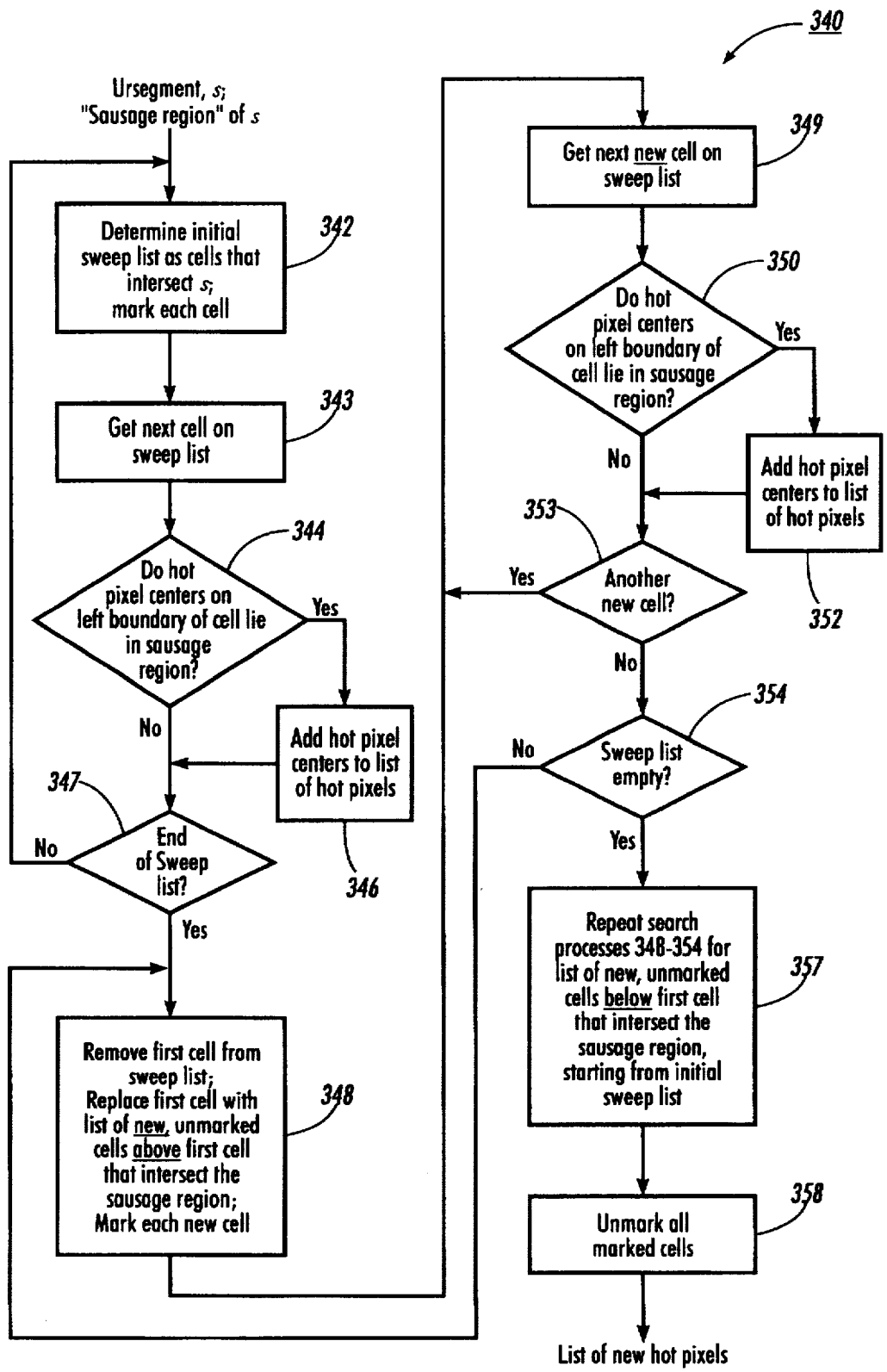
FIG. 19 is a flowchart illustrating another one of the searches of the VCD data structure illustrated in FIG. 17 to locate existing hot pixels through which the new ursegment passes, according to an illustrated embodiment of the present invention.
Figure 20:
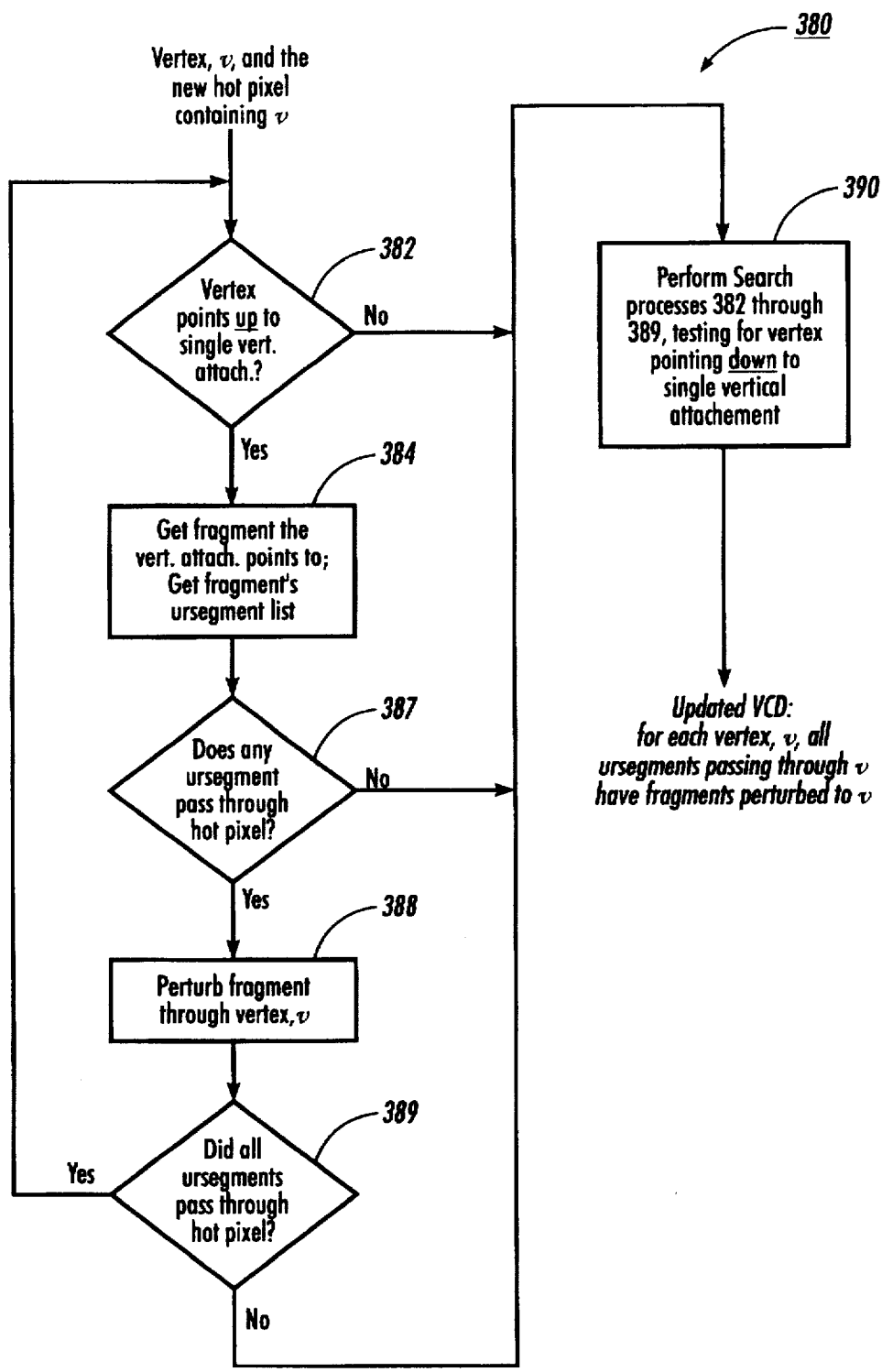
FIG. 20 is a flowchart illustrating a third search process shown in FIG. 17 through the VCD data structure to find existing ursegments that pass through new hot pixels, according to an illustrated embodiment of the present invention.

The discussion now turns to a description of each of these searches, which are illustrated in FIGS. 18-20.

a. VCD Traversal for Locating the Ursegments that Intersect New Ursegment s.

With reference now to FIG. 18, search 310, called "VCD traversal," produces a list of the locations of the new hot pixels in the partition that result from the endpoints of s and from the ursegments that intersect s. The VCD traversal starts in the VCD at the location of the left endpoint of s, in box 312. This pixel is designate as a new hot pixel. Then, the vertices near the left endpoint are located, and the fragments near each of these vertices are determined, in box 314. For each fragment, the ursegments that belong to it are identified, in box 318; for each ursegment identified, the ursegment is tested for an intersection with s, and each pixel containing an intersection is designated as a new hot pixel. Next, s is followed through the VCD data structure to its next intersection with a fragment, in box 320. When s intersects a fragment, each ursegment belonging to the intersected fragment is tested, in box 326, for an intersection with s, and the pixel containing the intersection point is designated as a new hot pixel. A test is then made in box 328 to see if the right endpoint of the new ursegment has been reached. If it has not, the VCD traversal continues to the next intersection of s with a fragment, in box 320. If the right endpoint has been reached, the pixel containing the right endpoint is designated as a new hot pixel, and the endpoint operations in boxes 314 and 318 are repeated, in box 330. The new hot pixels are those containing the endpoints of s and its intersections with existing ursegments.

b. The Cell Sweep Search.

The operations of the second of the three searches, referred to as the "cell sweep search," are illustrated in FIG. 19; search 340 locates existing hot pixels through which s passes. First, a small region surrounding the length of ursegment s is defined as a search area; if an existing hot pixel is within this search area, the new ursegment s being inserted is required to be rounded to the integral point of that hot pixel by the rounding scheme. This search area is referred to as the "sausage region" of s, and is defined to be the Minkowski sum of s with a pixel centered at the origin. Search 340 is based on the following premises: If s passes through a hot pixel, the vertex at the pixel's center must lie in the sausage region of s. If a cell intersects the sausage region, the vertices contained in the cell may lie inside the sausage region. To find the hot pixels through which s passes, therefore, each cell that intersects the sausage region must be tested to determine whether the vertices that lie on the cell boundary are inside the sausage region. The search is carried out in the upward direction to the top of the sausage region, and then in the downward direction to the bottom of the sausage region.

With reference now to FIG. 19, the input to the cell sweep search 340 is the new ursegment s being inserted, and the sausage region of s. First, the cells that intersect s are determined, in box 342; these cells make up the initial sweep list, and each cell on this initial sweep list is marked to show that it has been searched. For the next cell on the sweep list (this is the first cell the first time through) obtained in box 343, the cell is tested, in box 344, to determine whether the hot pixel centers on the left boundary of the cell lies in the sausage region. If so, the hot pixel centers is added to the list of existing hot pixels through which s passes, in box 346, and control passes to the test in box 347. If the hot pixel centers on the left boundary of the cell does not lie in the sausage region, a test is made, in box 347, to determine whether the end of the initial sweep list has been reached. If not, control passes to box 343 to get the next cell on the sweep list; each cell on the initial sweep list is processed in the same manner, in boxes 344, 346 and 347 until the end of the initial sweep list is reached.

Next, in box 348, the upward part of the cell sweep begins; the first cell is removed from the sweep list, and replaced with a list of new, unmarked cells that lie vertically above the first cell and that intersect with the sausage region. If this first cell is called cell i, then for cell j to be above cell i, part of cell j's bottom boundary must coincide with part of cell i's top boundary. Note, however, that cells that are completely outside the sausage region are excluded from the sweep list. Note also that if there are no new cells to be added to the sweep list because none meet the criteria for adding, then the cell that is now the current first cell on the sweep list is removed and replaced with a list of new, unmarked cells that lie vertically above this current first cell and that intersect with the sausage region; thus, the cell sweep, in addition to sweeping up and down, is sweeping horizontally, along the ursegment s until all the cells that intersect s are processed.

Also in box 348, each of the new cells just added to the sweep list is marked. Then the cell testing operations are made, in boxes 349, 350, 352 and 353 until all of these new cells have been tested. When all of these new cells have been tested, a test is made in box 354 to determine if the sweep list is empty. If not, control returns to box 348, when the current first cell on the sweep list is removed, and replaced with a list of new, unmarked cells above the first cell that intersect with the sausage region, and this new set of cells is tested in the same manner. Thus, first cells are removed and replaced with cells above, if there are any, until the sweep list is empty.

Then, the downward part of the cell sweep begins, in box 357; it is entirely analogous to the upward cell sweep. At the conclusion of the downward cell sweep, marked cells are all unmarked, in box 358, and the list of hot pixels found in the search is returned. These are the existing hot pixels through which s passes, and, together with the new hot pixels that contain the vertices of the endpoints and intersections of s, they are used to determine the polysegment σ of s. The cost of the cell sweep is proportional to the number of cells that intersect the sausage region of s.

c. The VCD Range Search.

The VCD traversal search 310 produces a list of all of the vertices in the new hot pixels of s. These vertices may be conveniently used to find existing ursegments that pass through each new hot pixel. The search to find these existing ursegments is called a "vertical range search" and is illustrated in the flowchart of FIG. 20 as search 380. Search 380 takes as input a vertex v of a new hot pixel of s, and thus is repeated for each such new vertex. Search 380 is also divided into an upward and downward search in the VCD. For the upward search, the input vertex v is tested, in box 382, to determine whether it points up to a single vertical attachment. If not, the upward portion of the search is complete, and control passes to the downward search, in box 390. If vertex v does point up to a single vertical attachment, the fragment that the vertical attachment points to is obtained, in box 384, and the ursegment list pointed to by that fragment is obtained.

The ursegments on the fragment's list are then tested, in box 387, to determine whether any one of the ursegments passes through the hot pixel of v. If any one does, the ursegment's fragment is perturbed to pass through v. Note that one of the consequences of perturbing this fragment is, of course, to divide it into two fragments; another consequence is that the vertical attachment that pointed to that fragment collapses, and there is now a vertical attachment extending up from the new vertex to the fragment above the one that was just perturbed. The ursegments for the fragment being tested is checked, in box 389, to see if all ursegments passed through the hot pixel. If so, this means that there is a new vertical attachment that may point up to another fragment that passes through the hot pixel of v; thus, control passes back to the text in box 382 to determine if there is such a vertical attachment. If at least one of the ursegments on the fragment list did not pass through the hot pixel of v, the upward search is complete, and control passes to the downward search, in box 390.

When it is determined, in box 387, that none of ursegments of the fragment being tested pass through the hot pixel of v, the upward search is complete, and control thus transfers to the downward search, in box 390.

Downward search 390 is completely analogous to the upward search illustrated in boxes 382 through 389 in FIG. 20. Completion of the upward and downward searches for existing ursegments that pass through a new hot pixels of a vertex v of s produces an updated VCD where the existing ursegments found have fragments rounded to v.

d. Inserting an Ursegment in the VCD Hierarchy.

A new ursegment is inserted into the l bottommost levels of the hierarchy, where l is computed independently for each ursegment and equals the number of trials of flipping a coin until tails is obtained. To insert the ursegment, locate an endpoint at all levels of the hierarchy as above, and then insert the ursegment at the bottommost l levels independently using insertion operation 300 of FIG. 17. At each level, the descent pointers of the ursegment and of any new vertices created by the insertion are linked to the corresponding ursegments and vertices one level down.

6. Deleting ursegments in the illustrated embodiment of the present invention.

An ursegment is deleted from the hierarchy by deleting it independently from each level. To delete an ursegment, visit the fragments of s's polysegment σ and remove s from each fragment's list of ursegments. When a list becomes empty, delete the fragment. Next, delete each vertex of σ in a hot pixel that became hot only because s ended or intersected another ursegment in the pixel; this can be decided efficiently by using the order in which the ursegments enter or leave that pixel. These operations leave the VCD in the state in which it would have been had s never been inserted.

C. The Machine and Software Product of the Invention

1. The Machine of the Present Invention.

Figure 21:
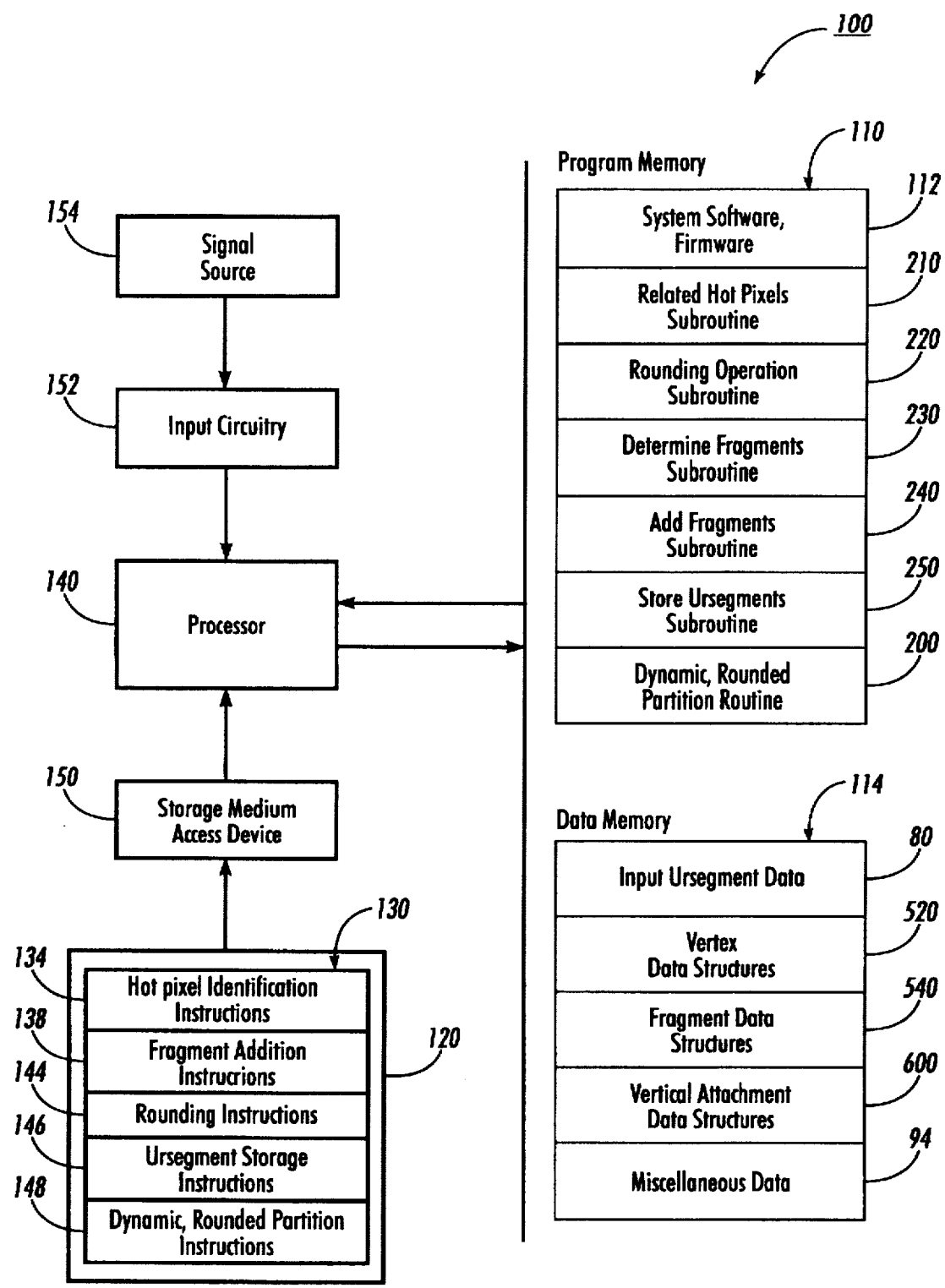
FIG. 21 is a simplified block diagram illustrating a machine in which the dynamic, rounded partition technique of the present invention may be used, and a software product that stores instruction data for implementing the present invention on the machine.

FIG. 21 is a block diagram of a generalized, processor-controlled machine 100. The present invention operates any machine having the common components, characteristics, and configuration of machine 100 illustrated in FIG. 21. For example, machine 100 may be a general purpose computer, a special purpose computer optimized for the types of operations performed by the present invention, or a combination of a general purpose computer and auxiliary special purpose hardware. The machine configuration illustrated at this high level is a known configuration. However, a machine such as machine 100 suitably programmed to embody the present invention is not a standard or known configuration.

An input signal source device 154 provides signals indicating ursegment data and function data, such as insertion and deletion functions. These input signals are forwarded via input input circuitry 152 to processor 140 and may be stored in data memory 114. Processor 140 may be included in any well-known device, such as a general purpose computer, configured according to the present invention. In response to a function signal and to signals indicating ursegment data, processor 140 performs the general operations indicated in FIG. 8 or in FIG. 8A, producing a rounded VCD data structure which may be stored in data memory 114, or in any other suitable storage device, or it may be output to a destination device (not shown) such as a printer or display.

Processor 140 operates by accessing program memory 110 to retrieve instructions, which it then executes. Program memory 110 includes dynamic, rounded VCD instructions 200 that implement the invention described in the flowcharts of FIGS. 8 and 8A, as well as the embodiments of the invention described in the flowcharts of FIGS. 17 and 18. Program memory 110 includes instructions for any subroutines needed to implement the invention according to instructions 200; examples of these are also shown in program memory 110. During execution of the instructions, processor 140 may access data memory 114 to obtain or store data necessary for performing image classification. Data memory 114 stores the vertex data structures 520 of the type shown in FIG. 11, the fragment data structures 540 of the type shown in FIG. 12, the vertical attachment data structures 600, and input ursegment data 80. Data memory 114 also stores various other miscellaneous data 94, including, for example, the list of new hot pixels produced by operation 310 of FIG. 18 when machine 100 implements the illustrated embodiment of the present invention.

The actual manner in which the physical components of machine 100 are connected may vary, and may include hardwired physical connections between some or all of the components, as well as connections over wired or wireless communications facilities, such as through remote or local communications networks and infrared and radio connections. Program memory 110 or data memory 114, for example, may include memory that is physically connected to processor 140 as local memory, or that is remotely accessible to processor 140 by means of a wired or wireless communications facility.

2. The Software Product of the Present Invention.

FIG. 21 also shows software product 120, an article of manufacture that can be used in a machine that includes components like those shown for machine 100. Software product 120 includes data storage medium 130 that can be accessed by storage medium access device 150. Software product 120 may be commercially available to a consumer in the form of a shrink-wrap package that includes data storage medium 130 and appropriate documentation describing the operation of the software product. In that case, a data storage medium is a physical medium that can store data. Examples of data storage media include magnetic media such as floppy disks and PC cards (also known as PCMCIA memory cards), optical media such as CD-ROMs, and semiconductor media such as semiconductor ROMs and RAMs. As used herein, "storage medium" covers one or more distinct units of a medium that together store a body of data. For example, a set of floppy disks storing a single body of data would be a storage medium. A "storage medium access device" is a device with circuitry that can access data on a data storage medium. Examples of storage medium access devices include floppy disk drives and CD-ROM readers.

Software product 120 may also be stored on a remotely-located storage device, such as a server, and may be commercially available to a purchaser in the form of a data stream indicating instructions for carrying out the present invention that are transmitted to the consumer over a communications facility from the remotely-located storage device. In the latter case, article 120 and data storage medium 130 are embodied in physical form as the remotely-located storage device; the consumer purchases a copy of the contents of data storage medium 130 (i.e., instruction data 134, 138, 144, 146 and 148 described in more detail below), but typically does not purchase the actual remotely-located storage device. When software product 120 is provided in the form of a data stream transmitted to the consumer over a communications facility from the remotely-located storage device, the data stream (including instruction data 134, 138, 144, 146 and 148) is stored in some suitable memory device of machine 100, which might be program memory 110, or a data storage medium locally accessible to machine 100, which would then be accessible using storage medium access device 150.

Data storage medium 130 stores instruction data 134, 138, 144, 146 and 148 which is provided to processor 140 for execution when the technique of the present invention is to be carried out. Note that data storage medium 130 in FIG. 21 shows only a representative portion of the instruction data stored thereon, and stores other instruction data for other operations, such as those shown in FIG. 8A, that are also part of the present invention. The stored data include data indicating hot pixel identification instructions 134; when these instructions are provided to processor 140, and processor 140 executes them, the machine is operated to perform the operations for identifying all related hot pixels of a new ursegment, as represented in box 210 in FIG. 8 for inserting a new ursegment in VCD data structure 500; if software product 120 implements the illustrated embodiment of FIG. 17, then hot pixel identification instructions 134 perform the operations for searching the VCD data structure in boxes 310, 340 and 380 of FIG. 17.

The stored data also include data indicating rounding instructions 144; when these instructions are provided to processor 140, and processor 140 executes them, the machine is operated to perform the operations for rounding the vertices that are contained in and ursegments that pass through hot pixels represented in box 220 in FIG. 8; if software product 120 implements the illustrated embodiment of FIGS. 17, then rounding instructions 144 perform the operations of boxes 360 and 394 of FIG. 17 for rounding vertices in hot pixels.

The stored data also include data indicating fragment addition instructions 138; when these instructions are provided to processor 140, and processor 140 executes them, the machine is operated to perform the operations for determining and adding fragments created by adding the new ursegment to the partition data structure, as represented in box 240 in FIG. 8; if software product 120 implements the illustrated embodiments of FIG. 17, then fragment addition instructions 138 perform the operations for determining the fragments of the new and existing polysegments, in boxes 364 and 398 of FIG. 17.

The stored data further include data indicating ursegment storage instructions 146; when these instructions are provided to processor 140, and processor 140 executes them, the machine is operated to perform the operations for storing the ursegments in the partition data structure, as represented in box 250 in FIG. 8; if software product 120 implements the illustrated embodiment of FIG. 17, then ursegment storage instructions 146 perform the operations of updating the fragment lists of ursegments that are part of operations 364 and 398 in FIG. 17.

Stored instruction data 134, 138, 144, 146 and 148 are capable of activating and controlling the action of a machine configured as shown for machine 100 in the very specific manner described above with respect to the processes referenced in FIGS. 8, 8A and 17. The article of manufacture, therefore, in its intended environment of use, i.e., a machine with a processor, controls the operation of the machine, and produces physical results when sensed by the processor. The processor responds to what is sensed and performs the acts directed by the stored instruction data.

It can be seen from the foregoing discussion that the method and software product of the present invention provide a technique for building a partition of a set of line segments using a rounding operation that is topologically consistent with an ideal partition of the line segments, and that produces a partition based on a finite precision model of computer arithmetic. In addition, the technique is dynamic, permitting the insertion and deletion of line segments from the partition without rebuilding the entire partition for each insertion or deletion. The rounding scheme of the illustrated embodiment of the present invention meets the goals of keeping each of the perturbed polysegments near its original ursegment, and of preserving as much as possible the topology of the original partition.

While this invention has been described in conjunction with at least two specific embodiments thereof, the description was not intended to limit the invention to the embodiments illustrated. It is evident that many alternatives, modifications and variations will be apparent to those skilled in the art. Accordingly, the invention as herein described is intended to embrace all such alternatives, modifications and variations that fall within the scope of the appended claims.

What is claimed:

1. For a processor-controlled system capable of operating on and displaying arrangements of line segments in a plane, a method for dynamically producing an output partition data structure representing said arrangement of line segments, said output partition data structure induced by an input unrounded line segment; the input unrounded line segment being represented by a set of real coordinates in the plane, the output partition data structure indicating an output rounded line segment representing the input line segment by a set of finite precision coordinates; the method comprising:

receiving data indicating the an input unrounded line segment and a signal to insert the unrounded input line segment into an input partition data structure indicating a first partition of the plane;

accessing the input partition data structure; the input partition data structure including data indicating a prior set of unrounded line segments; the prior set of unrounded line segments including a boundary set of unrounded line segments forming a rectangular boundary lying on the plane; locations in the input partition data structure being capable of being specified with reference to a finite precision grid of tiles superimposed on the plane; each tile having a position included therein referred to as an integral point having finite precision coordinates; the input unrounded line segment having real coordinates specifying a position within the rectangular boundary;

determining a plurality of tiles in the finite precision grid related to the input unrounded line segment using the prior set of unrounded line segments; the plurality of tiles in the finite precision grid related to the input unrounded line segment being hereafter referred to as a plurality of related hot pixels; each related hot pixel including an endpoint of the input unrounded line segment or at least one point on an unrounded line segment included in the input partition data structure, for each related hot pixel, performing a rounding operation using the input unrounded line segment; the rounding operation replacing real coordinates of a nonintegral point on an unrounded line segment located within the boundary of the related hot pixel with the finite precision coordinates of the integral point of the related hot pixel; the rounding operation causing an unrounded line segment to be split into two fragment line segments, each referred to individually as a fragment and collectively as a polysegment, having a vertex at the integral point in the related hot pixel; each fragment produced by the rounding operation being referred to as belonging to the unrounded line segment from which it was produced;

adding the fragments of the polysegment to the input partition data structure to produce an updated output partition data structure;

storing the input unrounded line segment in the output partition data structure; the input unrounded line segment being associated in the output partition data structure with all of the fragments belonging to the unrounded line segment from which it was produced; and displaying an arrangement of line segments using said output partition data structure.

2. The method of claim 1 for operating a processor-controlled machine to dynamically produce an output partition data structure further including receiving a second input unrounded line segment and a signal to delete the second unrounded input line segment from the input partition data structure;

determining at least one fragment belonging to the input unrounded line segment; and deleting the determined at least one fragment belonging to the input unrounded line segment from the input partition data structure to produce the updated output partition data structure.

3. The method of claim 1 for operating a processor-controlled machine to dynamically produce an output partition data structure wherein the rounding operation has a characteristic property that a partition of the plane induced by at least two intersecting polysegments produced by performing the rounding operation on the input unrounded line segment is topologically consistent with and geometrically accurate with respect to a partition of the plane induced by at least two intersecting input unrounded line segments from which the two intersecting polysegments were produced.

4. The method of claim 1 for operating a processor-controlled machine to dynamically produce an output partition data structure wherein determining the related hot pixels using the prior set of unrounded line segments includes locating first and second hot pixels respectively containing endpoints of the input unrounded line segment; the first and second hot pixels being referred to as new hot pixels.

5. The method of claim 4 wherein determining the related hot pixels using the prior set of unrounded line segments further includes locating an intersection hot pixel including a vertex indicating an intersection between the input unrounded line segment and at least one unrounded line segment included in the prior set of unrounded line segments; the intersection hot pixel being referred to as a new hot pixel.

6. The method of claim 5 wherein determining the related hot pixels using the prior set of unrounded line segments further includes determining an unrounded line segment included in the prior set of unrounded line segments having a portion thereof passing through a new hot pixel.

7. The method of claim 1 for operating a processor-controlled machine to dynamically produce an output partition data structure wherein determining the related hot pixels using the prior set of unrounded line segments further includes locating a prior-designated hot pixel containing at least one point on the input unrounded line segment.

8. The method of claim 1 for operating a processor-controlled machine to dynamically produce an output partition data structure wherein all regions in the plane indicated by the input and output partition data structures include subregions referred to as cells; the cells having a standardized geometric shape having a fixed number of bounded sides; the method further including, when adding the determined at least one fragment representing the unrounded line segment to the input partition data structure produces a region in the plane having a shape different from the standardized geometric shape, adding line segments referred to as attachments to the input partition data structure to produce at least one cell having a standardized geometric shape.

9. The method of claim 8 wherein the standardized geometric shape is a trapezoid having at least two parallel sides; the line segments being added extending vertically from a vertex of a fragment produced by adding the unrounded line segment; the partition of the plane being referred to as a trapezoidal decomposition.

10. The method of claim 1 for operating a processor-controlled machine to dynamically produce an output partition data structure wherein the rounding operation replaces the real coordinates of a nonintegral point on an unrounded line segment located within the boundary of a related hot pixel with the finite precision coordinates of the integral point of the related hot pixel according to a set of rounding rules; replacing the real coordinates with the finite precision coordinates being referred to as perturbing the unrounded line segment to the integral point of a related hot pixel; the set of rules including perturbing an endpoint of the input unrounded line segment located within the boundary of a related hot pixel to the integral point of the related hot pixel; and perturbing an intersection point of the input unrounded line segment with an unrounded line segment included in the prior set of unrounded line segments located within the boundary of a related hot pixel to the integral point of the related hot pixel.

11. The method of claim 10 wherein the set of rules further includes perturbing an unrounded line segment included in the prior set of unrounded line segments located within the boundary of a related hot pixel to the integral point of the related hot pixel.

12. The method of claim 1 wherein the tile in the finite precision grid of tiles superimposed on the plane has the shape of a unit square.

13. An article of manufacture for use by a processor-controlled system capable of operating on and displaying arrangements of line segments in a plane, the system including input signal circuitry for receiving input signals; storage medium access circuitry for accessing a medium that stores data; a memory device for storing a partition data structure representing an arrangement of line segments in a plane; and a processor connected for receiving the input signals from the input signal circuitry, connected for accessing the partition data structure stored in the memory device, and connected for receiving data from the storage medium access circuitry; the article comprising:

a data storage medium that can be accessed by the storage medium access circuitry when the article is used by the machine; and data stored in the data storage medium so that the storage medium access circuitry can provide the stored data to the processor when the article is used by the machine; the stored data comprising instruction data indicating instructions the processor can execute, said instruction data including instructions for:

receiving data from the input signal circuitry indicating an input unrounded line segment and a signal to insert the unrounded input line segment into a partition data structure indicating a first partition of the plane, the input unrounded line segment being represented by a set of real coordinates in the planes accessing the partition data structure; the partition data structure including data indicating a prior set of unrounded line segments including a boundary set of unrounded line segments forming a rectangular boundary lying on the plane; locations in the partition data structure being capable of being specified with reference to a finite precision grid of tiles superimposed on the plane; each tile having a position included therein referred to as an integral point having finite precision coordinates; the set of real coordinates of the input unrounded line segment specifying a position within the rectangular boundary;

determining a plurality of tiles in the finite precision grid related to the input unrounded line segment using the prior set of unrounded line segments; the plurality of tiles in the finite precision grid related to the input unrounded line segment being hereafter referred to as a plurality of related hot pixels; each related hot pixel including an endpoint of the input unrounded line segment or at least one point on an unrounded line segment included in the partition data structure;

performing, for each related hot pixel, a rounding operation using the input unrounded line segment; the rounding operation replacing real coordinates of a nonintegral point on an unrounded line segment located within the boundary of the related hot pixel with the finite precision coordinates of the integral point of the related hot pixel; the rounding operation causing an unrounded line segment to be split into two fragment line segments, each referred to individually as a fragment and collectively as a polysegment, having a vertex at the integral point in the related hot pixel; each fragment produced by the rounding operation being referred to as belonging to the unrounded line segment from which it was produced;

adding the fragments of the polysegment to the partition data structure to produce a modified partition data structure;

storing the input unrounded line segment in the modified partition data structure; the input unrounded line segment being associated in the modified partition data structure with all of the fragments belonging to the unrounded line segment from which it was produced; and displaying an arrangement of line segments using said modified partition data structure.

14. The article of manufacture of claim 13 wherein all regions in the plane indicated by the partition data structure include subregions referred to as cells; each cell having a standardized geometric shape having a fixed number of bounded sides; and wherein, when a region in the plane having a shape different from the standardized geometric shape is produced as a result of the processor adding the at least one fragment representing the unrounded line segment to the modified partition data structure, said instruction data further including instructions for adding line segments referred to as attachments to the modified partition data structure to produce at least one cell having a standardized geometric shape.

15. The article of manufacture of claim 13 wherein replacing the real coordinates of a nonintegral point on an unrounded line segment with the finite precision coordinates of the integral point of the related hot pixel is referred to as perturbing the unrounded line segment to the integral point of a related hot pixel; and said instruction data further including instructions for perturbing an endpoint of the input unrounded line segment located within the boundary of a related hot pixel to the integral point of the related hot pixel; and perturbing an intersection point of the input unrounded line segment with an unrounded line segment included in the prior set of unrounded line segments located within the boundary of a related hot pixel to the integral point of the related hot pixel.

* * * * *